US010485086B2

(12) United States Patent
Laurisch et al.

(10) Patent No.: US 10,485,086 B2
(45) Date of Patent: Nov. 19, 2019

(54) SINGLE OR MULTI-PART INSULATING COMPONENT FOR A PLASMA TORCH, PARTICULARLY A PLASMA CUTTING TORCH, AND ASSEMBLIES AND PLASMA TORCHES HAVING THE SAME

(71) Applicant: Kjellberg-Stiftung, Finsterwalde (DE)

(72) Inventors: Frank Laurisch, Finsterwalde (DE); Volker Krink, Finsterwalde (DE); Timo Grundke, Finsterwalde (DE)

(73) Assignee: Kjellberg-Stiftung, Finsterwalde (DE)

( * ) Notice: Subject to any disclaimer, the term of this patent is extended or adjusted under 35 U.S.C. 154(b) by 218 days.

(21) Appl. No.: 14/890,615

(22) PCT Filed: Jul. 4, 2014

(86) PCT No.: PCT/IB2014/001275
§ 371 (c)(1),
(2) Date: Nov. 12, 2015

(87) PCT Pub. No.: WO2014/184656
PCT Pub. Date: Nov. 20, 2014

(65) Prior Publication Data

US 2016/0120014 A1 Apr. 28, 2016

(30) Foreign Application Priority Data

Oct. 4, 2013 (EP) .................................... 13004796

(51) Int. Cl.
*B23K 10/00* (2006.01)
*H05H 1/34* (2006.01)
*H05H 7/00* (2006.01)

(52) U.S. Cl.
CPC .............. *H05H 1/34* (2013.01); *H05H 7/001* (2013.01)

(58) Field of Classification Search
CPC .. H05H 1/34; H05H 7/001; H05H 2001/3436; H05H 2001/3442; H05H 2001/3457
(Continued)

(56) References Cited

U.S. PATENT DOCUMENTS 4,659,899 A * 4/1987 Welkie .................... H01J 27/10
174/14 R
5,393,952 A 2/1995 Yamaguchi et al.
(Continued)

FOREIGN PATENT DOCUMENTS

EP 0094984 11/1983
WO 03032693 4/2003

OTHER PUBLICATIONS

PCT/IB2014/001275; PCT International Search Report of the International Searching Authority dated Nov. 6, 2014.
(Continued)

*Primary Examiner* — Mark H Paschall
(74) *Attorney, Agent, or Firm* — Renner, Otto, Boisselle & Sklar, LLP

(57) ABSTRACT

The invention relates to a single or multipart insulating component for a plasma torch, particularly a plasma cutting torch, for electrical insulation between at least two electrically conductive components of the plasma torch, characterized in that the insulating component consists of an electrically non-conductive and easily thermally conductive material, or at least one part thereof consists of an electrically non-conductive and easily thermally conductive material. The invention further relates to assemblies and plasma torches having the same and to a method for processing, plasma cutting and plasma welding.

23 Claims, 33 Drawing Sheets

(58) Field of Classification Search
USPC ........ 219/121.5, 121.48, 121.51, 121.52, 75, 219/121.59
See application file for complete search history.

(56) References Cited

U.S. PATENT DOCUMENTS

| | | | | |
|---|---|---|---|---|
| 5,906,758 | A * | 5/1999 | Severance, Jr. | H05H 1/34 219/121.39 |
| 6,169,370 | B1 | 1/2001 | Platzer | |
| 7,214,413 | B2 * | 5/2007 | Koulik | H05H 1/48 219/121.47 |
| 7,605,340 | B2 * | 10/2009 | Duan | H05H 1/34 219/121.51 |
| 8,101,882 | B2 * | 1/2012 | Mather | H05H 1/34 219/121.51 |
| 8,387,359 | B2 * | 3/2013 | Valentian | F02K 9/95 60/257 |
| 9,605,376 | B2 * | 3/2017 | Mistry | D06M 10/025 |

OTHER PUBLICATIONS

PCT/IB2014/001275; Written Opinion of the International Searching Authority dated Nov. 6, 2014.
European Search Report for corresponding Application No. 13004796.2 dated Nov. 7, 2014.

* cited by examiner

SINGLE OR MULTI-PART INSULATING COMPONENT FOR A PLASMA TORCH, PARTICULARLY A PLASMA CUTTING TORCH, AND ASSEMBLIES AND PLASMA TORCHES HAVING THE SAME

The present application is a U.S. National Stage Application based on and claiming benefit of and priority under 35 U.S.C. § 371 to International Application No. PCT/IB2014/001275, filed 4 Jul. 2014, which in turn claims benefit of and priority to German Application No. 102013008353.2, filed 16 May 2013 and European Application No. 13004796.2, filed 4 Oct. 2013, the entirety of each of which is hereby incorporated herein by reference.

TECHNICAL FIELD

The present invention relates to a one- or multipart insulating part for a plasma torch, in particular a plasma cutting torch, for electrical insulation between at least two electrically conductive components of the plasma torch, to arrangements and plasma torches having such an insulating part, to plasma torches having such an arrangement and to a method for machining a workpiece with a thermal plasma, for plasma cutting and for plasma welding.

BACKGROUND

Plasma torches are quite generally used for the thermal machining of electrically conductive materials such as steel and nonferrous metals. In this case, plasma welding torches for welding and plasma cutting torches for cutting electrically conductive materials such as steel and nonferrous metals are used. Plasma torches usually consist of a torch body, an electrode, a nozzle and a holder therefor. Modern plasma torches additionally have a nozzle protective cap fitted over the nozzle. Often, a nozzle is fixed by means of a nozzle cap.

The components that become worn during operation of the plasma torch on account of the high thermal load brought about by the arc are, depending on the plasma torch type, in particular the electrode, the nozzle, the nozzle cap, the nozzle protective cap, the nozzle protective cap holder and the plasma-gas conveying and secondary-gas conveying parts. These components can be easily changed by an operator and thus be referred to as wearing parts.

The plasma torches are connected via lines to a power source and a gas supply which supply the plasma torch. Furthermore, the plasma torch can be connected to a cooling device for a cooling medium, for example a cooling liquid.

Particularly high thermal loads occur in plasma cutting torches. These are caused by the great constriction of the plasma jet by the nozzle bore. Here, by contrast with plasma welding, small bores are used with regard to the cutting current in order that high current densities of 50 to 150 $A/mm^2$ in the nozzle bore, high energy densities of about $2\times10^6$ $W/cm^2$ and high temperatures of up to 30 000 K are generated. Furthermore, relatively high gas pressures, generally up to 12 bar, are used in the plasma cutting torch. The combination of high temperature and great kinetic energy of the plasma gas flowing through the nozzle bore result in the workpiece melting and the molten material being driven out. A cutting kerf is produced and the workpiece is separated. In plasma cutting, use is often also made of oxidizing gases in order to cut unalloyed steels. This also additionally leads to a high thermal load on the wearing parts and the plasma cutting torch.

The plasma cutting torch will be addressed in particular below.

A plasma gas flows between the electrode and the nozzle. The plasma gas is conveyed by a gas conveying part, which can also be a multipart part. In this way, the plasma gas can be directed in a targeted manner. Often it is set in rotation about the electrode by a radial and/or axial offset of the openings in the plasma-gas conveying part. The plasma-gas conveying part consists of electrically insulating material since the electrode and the nozzle have to be electrically insulated from one another. This is necessary since the electrode and the nozzle have different electrical potentials during operation of the plasma cutting torch. In order to operate the plasma cutting torch, an arc, which ionizes the plasma gas, is generated between the electrode and the nozzle and/or the workpiece. In order to strike the arc, a high voltage can be applied between the electrode and nozzle, said high voltage ensuring that the section between the electrode and nozzle is pre-ionized and thus an arc is formed. The arc burning between the electrode and nozzle is also referred to as pilot arc.

The pilot arc passes out through the nozzle bore and meets the workpiece and ionizes the section to the workpiece. In this way, the arc can form between the electrode and workpiece. This arc is also referred to as main arc. During the main arc, the pilot arc can be switched off. However, it can also continue to operate. During plasma cutting, it is often switched off in order not to additionally load the nozzle.

In particular the electrode and the nozzle are subjected to high thermal stresses and have to be cooled. At the same time they also have to conduct the electrical current which is required to form the arc. Therefore, materials with good thermal conductivity and good electrical conductivity, generally metals, for example copper, silver, aluminum, tin, zinc, iron or alloys in which at least one of these metals is contained, are used therefor.

The electrode often consists of an electrode holder and an emission insert which is produced from a material which has a high melting point (>2000° C.) and a lower electron work function than the electrode holder. When non-oxidizing plasma gases, for example argon, hydrogen, nitrogen, helium and mixtures thereof, are used, tungsten is used as material for the emission insert, and when oxidizing gases, for example oxygen, air and mixtures thereof, nitrogen/oxygen mixture and mixtures with other gases, are used, hafnium or zirconium are used as materials for the emission insert. The high-temperature material can be fitted into an electrode holder which consists of material with good thermal conductivity and good electrical conductivity, for example pressed in with a form fit and/or force fit.

The electrode and nozzle can be cooled by gas, for example the plasma gas or a secondary gas which flows along the outer side of the nozzle. However, cooling with a liquid, for example water, is more effective. In this case, the electrode and/or the nozzle are often cooled directly with the liquid, i.e. the liquid is in direct contact with the electrode and/or the nozzle. In order to guide the cooling liquid around the nozzle, a nozzle cap is located around the nozzle, the inner face of said nozzle cap forming with the outer face of the nozzle a coolant space in which the coolant flows.

In modern plasma cutting torches, a nozzle protective cap is additionally located additionally outside the nozzle and/or the nozzle cap. The inner face of the nozzle protective cap and the outer face of the nozzle or of the nozzle cap form a space through which a secondary or protective gas flows. The secondary or protective gas passes out of the bore in the nozzle protective cap and encloses the plasma jet and ensures a defined atmosphere around the latter. In addition, the secondary gas protects the nozzle and the nozzle protective cap from arcs which can form between these and the workpiece. These are referred to as double arcs and can result in damage to the nozzle. In particular when piercing the workpiece, the nozzle and the nozzle protective cap are highly stressed by hot material splashing up. The secondary gas, the volumetric flow of which can be increased during piercing compared with the value during cutting, keeps the material splashing up away from the nozzle and the nozzle protective cap and thus protects them from damage.

The nozzle protective cap is likewise subjected to high thermal stress and has to be cooled. Therefore, materials with good thermal conductivity and good electrical conductivity, generally metals, for example copper, silver, aluminum, tin, zinc, iron or alloys in which at least one of these metals is contained, are used therefor.

However, the electrode and the nozzle can also be cooled indirectly. In this case, they are in touching contact with a component which consists of a material with good thermal conductivity and good electrical conductivity, generally a metal, for example copper, silver, aluminum, tin, zinc, iron or alloys in which at least one of these metals is contained. This component is in turn directly cooled, i.e. it is in direct contact with the usually flowing coolant. These components can simultaneously serve as a holder or receptacle for the electrode, the nozzle, the nozzle cap or the nozzle protective cap and dissipate the heat and supply the power.

It is also possible for only the electrode or only the nozzle to be cooled with liquid. It is precisely in this case that excessive temperatures often occur at the only gas-cooled component, which then quickly becomes worn or is even destroyed. This also results in high temperature differences between the components in the plasma cutting torch and as a result in mechanical tensions and additional stresses.

The nozzle protective cap is usually cooled only by the secondary gas. Arrangements in which the nozzle protective cap is cooled directly or indirectly by a cooling liquid are also known.

Gas cooling (plasma-gas and/or secondary-gas cooling) has the drawback that it is not effective for achieving acceptable cooling or dissipation of heat and the required gas volumetric flow is very high for this purpose. Plasma cutting torches with water cooling require for example gas volumetric flows of 500 l/h to 4000 l/h, while plasma cutting torches without water cooling require gas volumetric flows of 5000 to 11 000 l/h. These ranges arise depending on the cutting currents used, which may be for example in a range from 20 to 600 A. At the same time, the volumetric flow of the plasma gas and/or the secondary gas should be selected such that the best cutting results are achieved. Excessive volumetric flows, which are required for cooling, however, often impair the cutting result.

In addition, the high gas consumption brought about by high volumetric flows is uneconomical. This applies particularly when gases other than air, for example argon, nitrogen, hydrogen, oxygen or helium, are used.

The use of direct water cooling for all wearing parts is, by contrast, very effective, but results in an increase in the dimensions of the plasma cutting torch since, for example, cooling channels are required for conveying the cooling liquid to the wearing parts to be cooled and away therefrom again. In addition, when the directly liquid-cooled wearing parts are changed, a great deal of care is necessary since as little cooling liquid as possible should remain between the wearing parts in the plasma cutting torch, since this can result in damage of the plasma torch when the arc is struck.

SUMMARY

Therefore, the invention is based on the object of ensuring more effective cooling of components, in particular wearing parts, of a plasma torch.

According to a first aspect, this object is achieved by a one- or multipart insulating part for a plasma torch, in particular a plasma cutting torch, for electrical insulation between at least two electrically conductive components of the plasma torch, characterized in that it consists of an electrically nonconductive material with good thermal conductivity or at least a part thereof consists of an electrically nonconductive material with good thermal conductivity. Here, the expression "electrically nonconductive" is also intended to mean that the material of the plasma torch insulating part conducts electricity to a minor or insignificant extent. The insulating part can be for example a plasma-gas conveying part, a secondary-gas conveying part or a cooling-gas conveying part.

Furthermore, according to a second aspect, this object is achieved by an arrangement made up of an electrode and/or a nozzle and/or a nozzle cap and/or a nozzle protective cap and/or a nozzle protective cap holder for a plasma torch, in particular a plasma cutting torch, and of an insulating part as claimed in one of claims 1 to 12.

According to a third aspect, this object is achieved by an arrangement made up of a receptacle for a nozzle protective cap holder and of a nozzle protective cap holder for a plasma torch, in particular a plasma cutting torch, characterized in that the receptacle is configured as an insulating part as claimed in one of claims 1 to 12 that is preferably in direct contact with the nozzle protective cap holder. For example, the receptacle and the nozzle protective cap holder can be connected together by a thread.

According to a further aspect, this object is achieved by an arrangement made up of an electrode and of a nozzle for a plasma torch, in particular a plasma cutting torch, characterized in that an insulating part as claimed in one of claims 1 to 12 that is configured as a plasma-gas conveying part is arranged between the electrode and the nozzle, preferably in direct contact therewith.

Furthermore, according to a further aspect, this object is achieved by an arrangement made up of a nozzle and of a nozzle protective cap for a plasma torch, in particular a plasma cutting torch, characterized in that an insulating part as claimed in one of claims 1 to 12 that is configured as a secondary-gas conveying part is arranged between the nozzle and the nozzle protective cap, preferably in direct contact therewith.

Moreover, according to a further aspect, this object is achieved by an arrangement made up of a nozzle cap and of a nozzle protective cap for a plasma torch, in particular a plasma cutting torch, characterized in that an insulating part as claimed in one of claims 1 to 12 that is configured as a secondary-gas conveying part is arranged between the nozzle cap and the nozzle protective cap, preferably in direct contact therewith.

Furthermore, the present invention provides a plasma torch, in particular a plasma cutting torch, comprising at least one insulating part as claimed in one of claims 1 to 12.

Furthermore, the present invention provides a plasma torch, in particular a plasma cutting torch, comprising at least one arrangement as claimed in one of claims 13 to 18, and a method as claimed in claim 24.

In the case of the insulating part, provision can be made for it to consist of at least two parts, wherein one of the parts consists of an electrically nonconductive material with good thermal conductivity and the other or at least one other of the parts consists of an electrically nonconductive and thermally nonconductive material.

In particular, provision can be made here for the part that consists of an electrically nonconductive material with good thermal conductivity to have at least one surface that functions as a contact face, said surface being aligned with or projecting beyond an immediately adjacent surface of the part that consists of an electrically nonconductive and thermally nonconductive material.

According to a particular embodiment, the insulating part consists of at least two parts, wherein one of the parts consists of a material with good electrical conductivity and good thermal conductivity and the other or at least one other of the parts consists of an electrically nonconductive material with good thermal conductivity.

In a further embodiment of the invention, the insulating part consists of at least three parts, wherein one of the parts consists of a material with good electrical conductivity and good thermal conductivity, one other of the parts consists of an electrically nonconductive material with good thermal conductivity and a further one of the parts consists of an electrically nonconductive and thermally nonconductive material.

Advantageously, the electrically nonconductive material with good thermal conductivity has a thermal conductivity of at least 40 W/(m*K), preferably at least 60 W/(m*K) and even more preferably at least 90 W/(m*K), even more preferably at least 120 W/(m*K), even more preferably at least 150 W/(m*K) and even more preferably at least 180 W/(m*K).

Expediently, the electrically nonconductive material with good thermal conductivity and/or the electrically nonconductive and thermally nonconductive material has an electrical resistivity of at least $10^6$ Ω*cm, preferably at least $10^{10}$ Ω*cm, and/or a dielectric strength of at least 7 kV/mm, preferably at least 10 kV/mm.

Advantageously, the electrically nonconductive material with good thermal conductivity is a ceramic, preferably from the group of the nitride ceramics, in particular aluminum nitride, boron nitride and silicon nitride ceramics, the carbide ceramics, in particular silicon carbide ceramics, the oxide ceramics, in particular aluminum oxide, zirconium oxide and beryllium oxide ceramics, and the silicate ceramics, or is a plastics material, for example plastics film.

It is also possible to use a combination of an electrically nonconductive material with good thermal conductivity, for example ceramic, and some other electrically nonconductive material, for example plastics material, in what is referred to as a compound material. Such a compound material can be produced for example from powder of both materials by sintering. Finally, this compound material has to be electrically nonconductive and have good thermal conductivity.

According to a particular embodiment of the invention, the electrically nonconductive and thermally nonconductive material has a thermal conductivity of at most 1 W/(m*K).

Advantageously, the parts are connected together in a form-fitting or force-fitting manner, by adhesive bonding or by a thermal method, for example soldering or welding.

In a particular embodiment of the invention, the insulating part has at least one opening and/or at least one cutout and/or at least one groove. This can be the case for example when the insulating part is a gas conveying part, for example a plasma-gas or secondary-gas conveying part.

In particular, provision can be made for the at least one opening and/or the at least one cutout and/or the at least one groove to be located in the electrically nonconductive material with good thermal conductivity and/or in the electrically nonconductive and thermally nonconductive material and/or in the material with good electrical conductivity and good thermal conductivity.

In a further particular embodiment of the invention, the insulating part is designed to convey a gas, in particular a plasma gas, secondary gas or cooling gas.

In the arrangement as claimed in claim 13, provision can be made for the insulating part to be in direct contact with the electrode and/or the nozzle and/or the nozzle cap and/or the nozzle protective cap and/or the nozzle protective cap holder.

Advantageously, the insulating part is connected to the electrode and/or the nozzle and/or the nozzle cap and/or the nozzle protective cap and/or the nozzle protective cap holder in a form-fitting and/or force-fitting manner, by adhesive bonding or by a thermal method, for example soldering or welding.

In a particular embodiment of the plasma torch as claimed in claim 19, the insulating part or a part thereof that consists of an electrically nonconductive material with good thermal conductivity has at least one surface, preferably two surfaces, functioning as a contact face, said surface being in direct contact at least with a surface of a component with good electrical conductivity, in particular an electrode, nozzle, nozzle cap, nozzle protective cap or nozzle protective cap holder, of the plasma torch.

In particular, provision can be made in this case for the insulating part or a part thereof that consists of an electrically nonconductive material with good thermal conductivity to have at least two surfaces functioning as contact faces, said surfaces being in direct contact at least with a surface of a component with good electrical conductivity, in particular an electrode, nozzle, nozzle cap, nozzle protective cap or nozzle protective cap holder, of the plasma torch and with a further surface of a further component with good electrical conductivity of the plasma torch.

According to a particular embodiment, the insulating part is a gas conveying part, in particular a plasma-gas, secondary-gas or cooling-gas conveying part.

Advantageously, the insulating part has at least one surface which is in direct contact with a cooling medium, preferably a liquid and/or a gas and/or a liquid/gas mixture, during operation.

In the method as claimed in claim 24, provision can be made for a laser beam of a laser to be coupled into the plasma torch in addition to the plasma jet.

In particular, the laser can be a fiber laser, diode laser and/or diode-pumped laser.

The invention is based on the surprising finding that, by using a material which is not only electrically nonconductive but also has good heat conductivity, more effective and more cost-effective cooling is possible and smaller and simpler designs of plasma torches are possible and smaller temperature differences and thus lower mechanical tensions can be achieved.

The invention provides, at least in one or more particular embodiment(s), cooling of components, in particular wearing parts, of a plasma torch, which is more effective and/or cost-effective and/or results in lower mechanical tensions and/or allows smaller and/or more simple plasma torch designs and at the same time ensures electrical insulation between components of a plasma torch.

BRIEF DESCRIPTION OF THE DRAWINGS

Further features and advantages of the invention can be gathered from the appended claims and the following description, in which a number of exemplary embodiments are described by way of the schematic drawings, in which:

DETAILED DESCRIPTION

Figure 1:
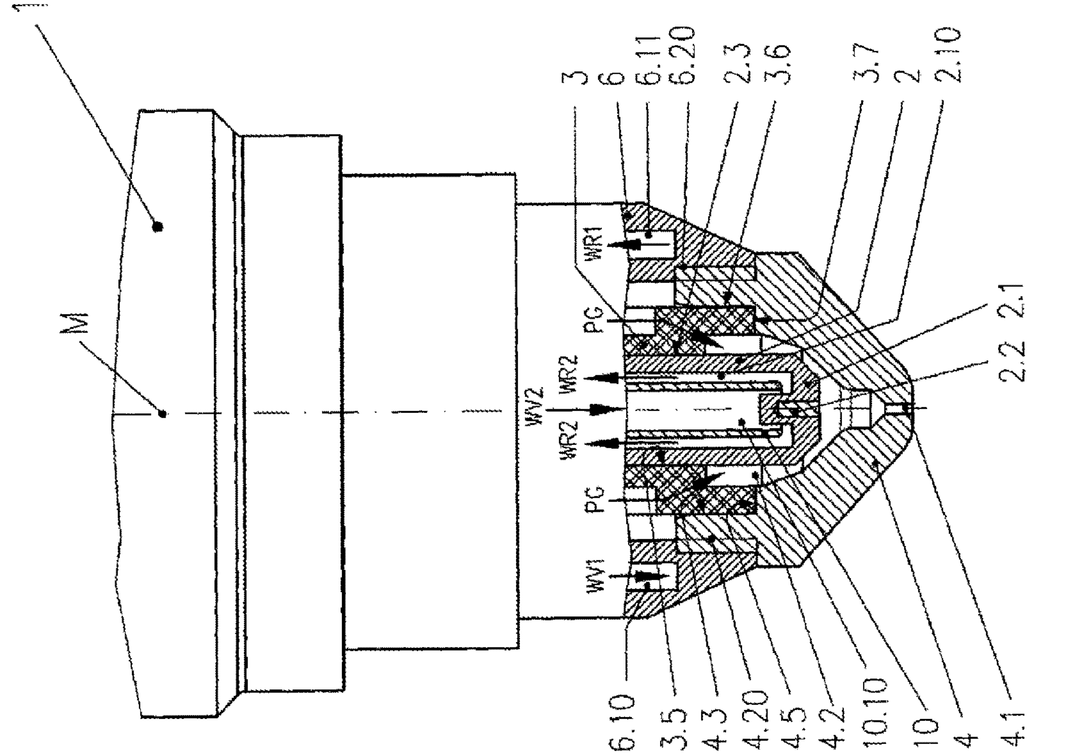
FIG. 1 shows a side view in partial longitudinal section of a plasma torch according to a first particular embodiment of the invention.

FIG. 1 shows a liquid-cooled plasma cutting torch 1 according to one particular embodiment of the present invention. It comprises an electrode 2, an insulating part, configured as a plasma-gas conveying part 3, for conveying plasma gas PG, and a nozzle 4. The electrode 2 consists of an electrode holder 2.1 and an emission insert 2.2. The electrode holder 2.2 consists of a material with good electrical conductivity and good thermal conductivity, in this case of a metal, for example copper, silver, aluminum or an alloy in which at least one of these metals is contained. The emission insert 2.2 is produced from a material which has a high melting point (>2000° C.). In this case, when non-oxidizing plasma gases (for example argon, hydrogen, nitrogen, helium and mixtures thereof) are used, tungsten is suitable for example, and when oxidizing gases (for example oxygen, air, mixtures thereof, nitrogen/oxygen mixture) are used, hafnium or zirconium are suitable for example. The emission insert 2.2 is introduced into the electrode holder 2.1. The electrode 2 is illustrated here as a flat electrode in which the emission insert 2.2 does not project beyond the surface of the front end of the electrode holder 2.1.

The electrode 2 projects into the hollow interior space 4.2 of the nozzle 4. The nozzle is screwed by way of a thread 4.20 into a nozzle holder 6 with an internal thread 6.20. Arranged between the nozzle 4 and the electrode 2 is the plasma-gas conveying part 3. Located in the plasma-gas conveying part 3 are bores, openings, grooves and/or cutouts (not illustrated) through which the plasma gas PG flows. By way of a corresponding arrangement, for example with a radial offset and/or an inclination of radially arranged bores with respect to the center line M, the plasma gas PG can be set in rotation. This serves to stabilize the arc and the plasma jet.

The arc burns between the emission insert 2.2 and a workpiece (not illustrated) and is constricted by a nozzle bore 4.1. The arc itself is already at a high temperature, which is increased even more by its constriction. In this case, temperatures of up to 30 000 K are indicated. For this reason, the electrode 2 and the nozzle 4 are cooled by a cooling medium. A liquid, in the simplest case water, a gas, in the simplest case air, or a mixture thereof, in the simplest case an air/water mixture, which is referred to as an aerosol, can be used as the cooling medium. Liquid cooling is the most effective. Located in an interior space 2.10 of the electrode 2 is a cooling pipe 10 through which the coolant is fed back to the coolant return line WR2 from the coolant feed line WV2, through the coolant space 10.10 toward the electrode 2, into the vicinity of the emission insert 2.2, and through the space which is formed by the outer face of the cooling pipe 10 in the inner face of the electrode 2.

In this example, the nozzle 4 is cooled indirectly via the nozzle holder 6, to which the coolant is conveyed through a coolant space 6.10 (WV1) and away from which the coolant is conveyed again via a coolant space 6.11 (WR1). The coolant usually flows with a volumetric flow of 1 to 10 l/min. The nozzle 4 and the nozzle holder 6 consist of a metal. As a result of the mechanical contact formed with the aid of the external thread 4.20 of the nozzle 4 and the internal thread 6.20 of the nozzle holder 6, the heat arising in the nozzle 4 is guided into the nozzle holder 6 and dissipated by the flowing cooling medium (WV1, WR1).

The insulating part configured as a plasma-gas conveying part 3 is formed in one part in this example and consists of an electrically nonconductive material with good thermal conductivity. As a result of such an insulating part being used, electrical insulation is achieved between the electrode 2 and the nozzle 4. This is necessary for operation of the plasma cutting torch 1, specifically the high-voltage striking and the operation of a pilot arc burning between the electrode 2 and the nozzle 4. At the same time, heat is conducted between the electrode 2 and the nozzle 4 from the hotter to the colder component via the insulating part with good thermal conductivity that is configured as a plasma-gas conveying part 3. Additional heat exchange thus occurs via the insulating part. The plasma-gas conveying part 3 is in touching contact with the electrode 2 and the nozzle 4 via contact faces.

In this exemplary embodiment, a contact face 2.3 is for example a cylindrical outer face of the electrode 2 and a contact face 3.5 is a cylindrical inner face of the plasma-gas conveying part 3. A contact face 3.6 is a cylindrical outer face of the plasma-gas conveying part 3 and a contact face 4.3 is a cylindrical inner face of the nozzle 4. Preferably, a clearance fit with a small clearance, for example H7/h6 according to DIN EN ISO 286, between the cylindrical inner and outer faces is used here in order to realize both the plugging into one another and also good contact and thus low thermal resistance and thus good heat transfer. The heat transfer can be improved by applying thermally conductive paste to these contact faces. (Observation: even if a thermally conductive paste is used, this is still intended to be covered by the expression “direct contact”.) A fit with a larger clearance, for example H7/g6, can then be used. Furthermore, the nozzle 4 and the plasma-gas conveying part 3 each have a contact face 4.5 and 3.7, here, these being annular faces and in touching contact with one another, here. This is a force-fitting connection between the annular faces, which is realized by screwing the nozzle 4 into the nozzle holder 6.

On account of the good thermal conductivity, high temperature differences between the nozzle 4 and the electrode 2 can be avoided and mechanical tensions in the plasma cutting torch 1 that are caused thereby can be reduced.

A ceramic material for example is used here as the electrically nonconductive material with good thermal conductivity. Aluminum nitrite, which, according to DIN 60672, has very good thermal conductivity (about 180 W/(m*K)) and high electrical resistivity (about $10^{12}$ Ω*cm), is particularly suitable.

Figure 2:
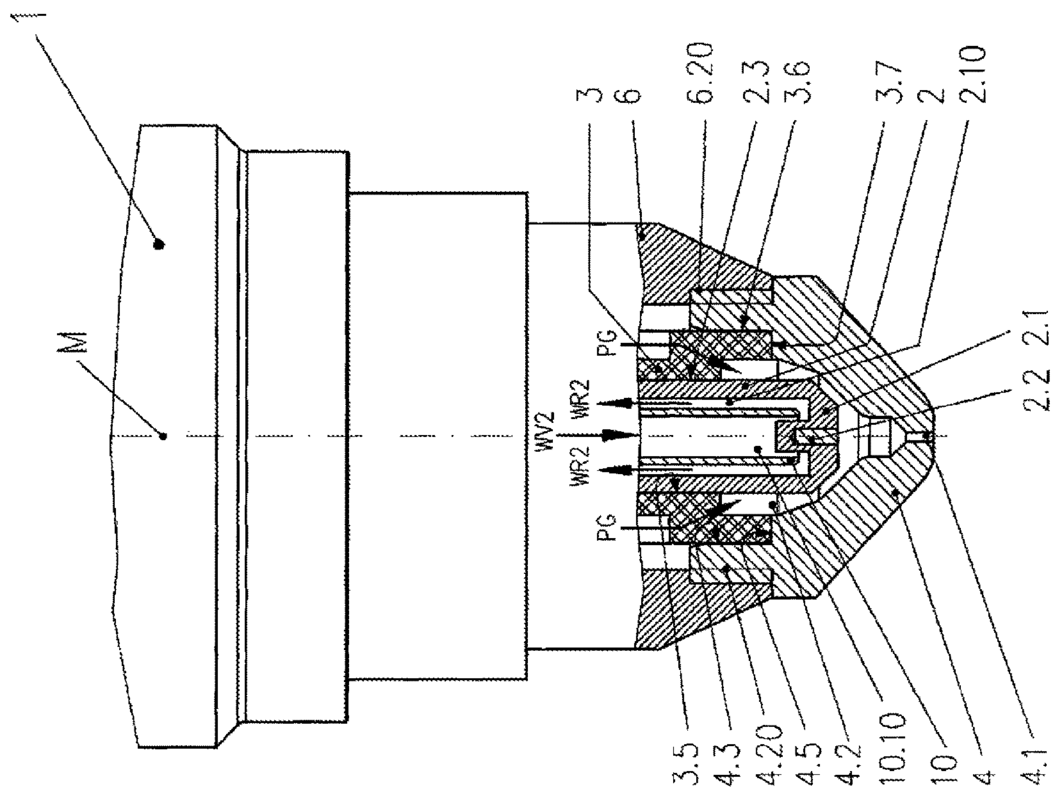
FIG. 2 shows a side view in partial longitudinal section of a plasma torch according to a second particular embodiment of the invention.

FIG. 2 shows a cylindrical plasma cutting torch 1 in which the electrode 2 is cooled directly by coolant. The indirect cooling, shown in FIG. 2, of the nozzle 4 via the nozzle holder 6 is not provided. The nozzle 4 is cooled by heat conduction via an insulating part, configured as a plasma-gas conveying part 3, toward the electrode 2 cooled directly by coolant. As a result of such an insulating part being used, electrical insulation between the electrode 2 and the nozzle 4 is achieved. This is necessary for operation of the plasma cutting torch 1, specifically the high-voltage striking and the operation of the pilot arc burning between the electrode 2 and the nozzle 4. At the same time, heat is conducted between the electrode 2 and the nozzle 4 from the hotter to the colder component via the insulating part with good thermal conductivity that is configured as a plasma-gas conveying part 3. Additional heat exchange thus occurs between the electrode 2 and the nozzle 4 via the plasma-gas conveying part 3. The plasma-gas conveying part 3 is in touching contact with the electrode and the nozzle 4 via contact faces.

In this exemplary embodiment, a contact face 2.3 is for example a cylindrical outer face of the electrode 2 and a contact face 3.5 is a cylindrical inner face of the plasma-gas conveying part 3. A contact face 3.6 is a cylindrical outer face of the plasma gas conveying part 3 and a contact face 4.3 is a cylindrical inner face of the nozzle 4. Preferably, a clearance fit with a small clearance, for example H7/h6 according to DIN EN ISO 286, between the cylindrical inner and outer faces is used here in order to realize both the plugging into one another and also good contact and thus low thermal resistance and thus good heat transfer. The heat transfer can be improved by applying thermally conductive paste to these contact faces. A fit with a larger clearance, for example H7/g6, can then be used. Furthermore, the nozzle 4 and the plasma-gas conveying part 3 each have a contact face 4.5 and 3.7, respectively, here, these being annular faces and in touching contact with one another, here. This is a force-fitting connection between the annular faces, which is realized by screwing the nozzle 4 into the nozzle holder 6.

The omission of the indirect cooling for the nozzle 4 results in a considerable simplification of the structure of the plasma cutting torch 1, since the coolant spaces in the nozzle holder 6, which are otherwise necessary in order to convey the coolant to its area of action and away again, are dispensed with. The electrode is cooled as in FIG. 1.

Figure 3:
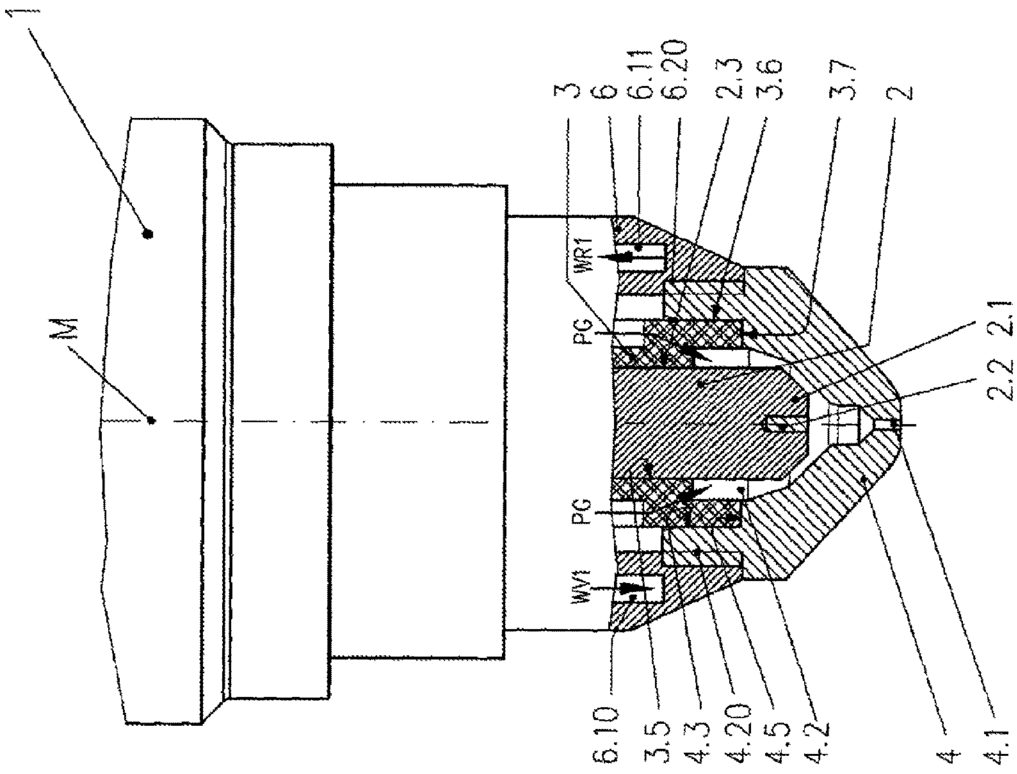
FIG. 3 shows a side view in partial longitudinal section of a plasma torch according to a third particular embodiment of the invention.

FIG. 3 shows a plasma cutting torch 1 in which a nozzle 4 is cooled indirectly via a nozzle holder 6, to which the coolant is conveyed through a coolant space 6.10 (WV1) and away from which the coolant is conveyed again via a coolant space 6.11 (WR1). The direct cooling, shown in FIGS. 1 and 2, of the electrode 2 is not provided. The thermal conduction from the electrode 2 to the nozzle 4 takes place via an insulating part, configured as a plasma-gas conveying part 3, with respect to the indirectly coolant-cooled nozzle 4. In this respect, the statements made with regard to FIGS. 1 and 2 apply.

This results in a considerable simplification of the structure of the plasma torch 1 and of the electrode 2, since the cooling pipe 10 and the coolant spaces 2.10 and 10.10, shown in FIGS. 1 and 2, which are otherwise necessary in order to convey the cooling liquid to its area of action (WV2) and away again (WR2), are dispensed with.

Figure 4:
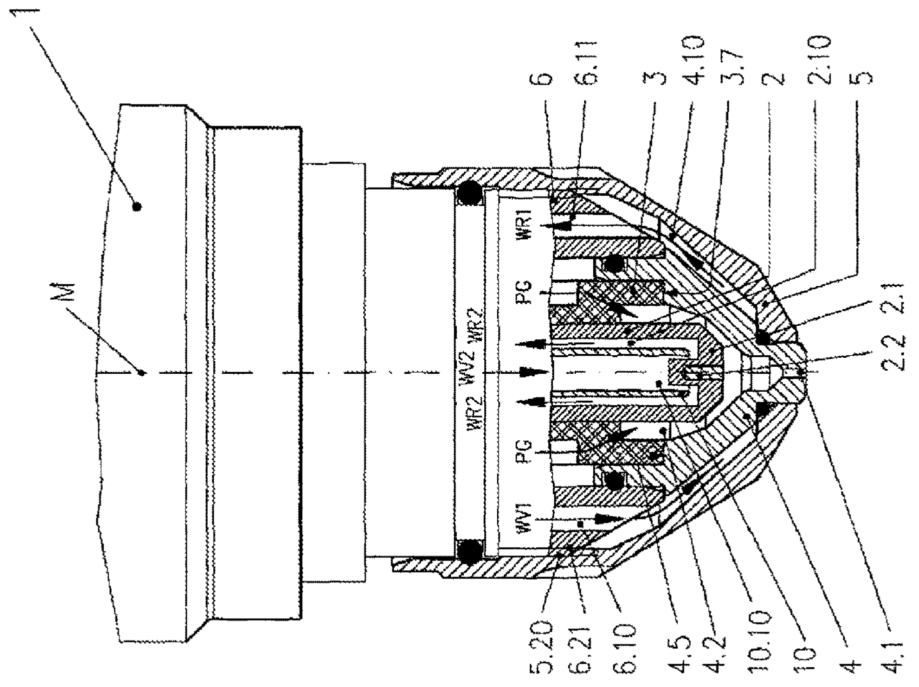
FIG. 4 shows a side view in partial longitudinal section of a plasma torch according to a fourth particular embodiment of the invention.

The plasma cutting torch 1 illustrated in FIG. 4 differs from the plasma cutting torch illustrated in FIG. 1 in that the nozzle 4 is cooled directly by a coolant. To this end, the nozzle 4 is fixed by a nozzle cap 5. An internal thread 5.20 of the nozzle cap 5 is screwed together with an external thread 6.21 of a nozzle holder 6. The outer face of the nozzle 4 and a part of the nozzle holder 6 and also the inner face of the nozzle cap 5 form a coolant space 4.10 through which the coolant, which flows to its area of action (WV1) and back again (WR1) through coolant spaces 6.10 and 6.11 in the nozzle holder 6.

Arranged between the nozzle 4 and an electrode 2 is an insulating part configured as a plasma-gas conveying part 3. Thus, the same advantages are achieved as were explained in connection with FIG. 1. The heat is transferred between the electrode 2 and the nozzle 4 from the hotter to the colder component via the insulating part with good thermal conductivity that is configured as a plasma-gas conveying part 3. The plasma-gas conveying part 3 is in touching contact with the electrode 2 and the nozzle 4. Thus, mechanical tensions in the plasma cutting torch 1 that are brought about by large temperature differences can be reduced.

One advantage compared with the plasma cutting torch shown in FIG. 1 is that the directly coolant-cooled nozzle 4 is cooled better than the indirectly cooled nozzle. Since the coolant in this arrangement flows right into the vicinity of the nozzle tip and of a nozzle bore 4.1, where the greatest heating of the nozzle takes place, the cooling effect is particularly great. The coolant space is sealed by O-rings between the nozzle cap 5 and the nozzle 4, between the nozzle cap 5 and the nozzle holder 6 and between the nozzle 4 and the nozzle holder 6.

The nozzle cap 5, too, is cooled by the coolant which flows through the coolant space 4.10, which is formed by the outer face of the nozzle 4 and the inner face of the nozzle cap 5. The nozzle cap 5 is heated primarily by the radiation of the arc or of the plasma jet and of the heated workpiece.

However, the structure of the plasma cutting torch 1 is more complicated, since a nozzle cap 5 is additionally required. A liquid, in the simplest case water, is preferably used as the coolant, here.

Figure 5:
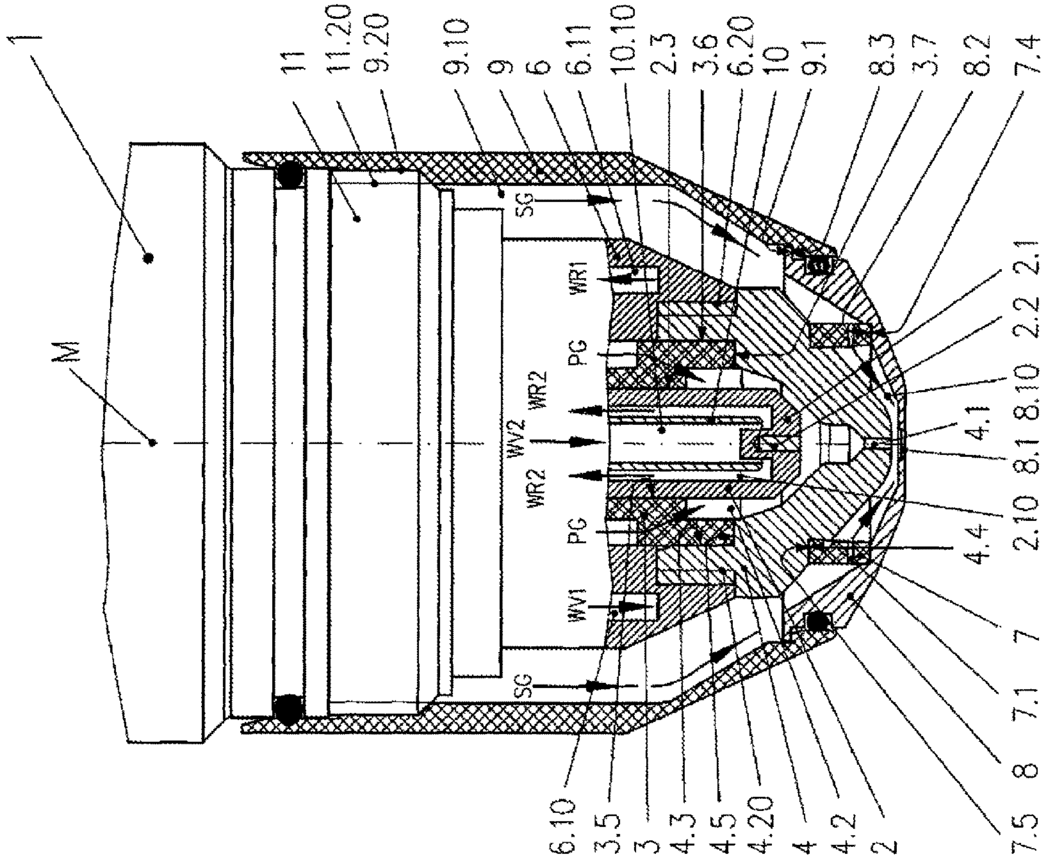
FIG. 5 shows a side view in partial longitudinal section of a plasma torch according to a fifth particular embodiment of the invention.

FIG. 5 shows a plasma cutting torch 1 which is similar to the plasma cutting torch in FIG. 1 but in which a nozzle protective cap 8 is additionally arranged outside the nozzle 4. Bores 4.1 in the nozzle 4 and 8.1 in the nozzle protective cap 8 are located on a center line M. The inner faces of the nozzle protective cap 8 and of a nozzle protective cap holder 9 form, with the outer faces of the nozzle 4 and of the nozzle holder 6, spaces 8.10 and 9.10 through which a secondary gas SG flows. This secondary gas passes out of the bore in the nozzle protective cap 8.1 and encloses the plasma jet (not illustrated) and ensures a defined atmosphere around the latter. In addition, the secondary gas SG protects the nozzle 4 and the nozzle protective cap 8 from arcs which can form between them and the workpiece. These are referred to as double arcs and can result in damage to the nozzle 4. In particular when piercing the workpiece, the nozzle 4 and the nozzle protective cap 8 are highly stressed by hot molten material splashing up. The secondary gas SG, the volumetric flow of which can be increased during piercing compared with the value during cutting, keeps the material splashing up away from the nozzle 4 and the nozzle protective cap 8 and thus protects them from damage.

For cooling the electrode 2 and the nozzle 4, the statements made with respect to the plasma cutting torch 1 according to FIG. 1 apply. In principle, direct cooling of only the electrode 2—as shown in FIG. 2—and indirect cooling of only the nozzle 4—as shown in FIG. 3—are also possible in a plasma cutting torch 1 with secondary gas. The statements made with respect thereto also apply.

In the case of the plasma cutting torch 1 shown in FIG. 5, in addition to the electrode 2 and the nozzle 4, the nozzle protective cap 8 also has to be cooled. The nozzle protective cap 8 is heated in particular by the radiation of the arc or of the plasma jet and of the heated workpiece. In particular when piercing the workpiece, the nozzle protective cap 8 is highly thermally stressed and heated by red-hot material splashing up and has to be cooled. Therefore, materials with good thermal conductivity and good electrical conductivity, generally metals, for example silver, copper, aluminum, tin, zinc, iron, alloyed steel or a metal alloy (for example brass) in which these metals are contained individually or in a total amount of at least 50%, are used therefor.

The secondary gas SG first of all flows through the plasma cutting torch 1, before it passes through a first space 9.10 which is formed by the inner faces of the nozzle protective cap holder 9 and of the nozzle protective cap 8 and the outer faces of the nozzle holder 6 and of the nozzle 4. The first space 9.10 is also bounded by an insulating part, configured as a secondary-gas conveying part 7, which is located between the nozzle 4 and the nozzle protective cap 8. The secondary-gas conveying part 7 can be formed in a multipart manner.

Located in the secondary-gas conveying part 7 are bores 7.1. However, these can also be openings, grooves or cutouts through which the secondary gas SG flows. By way of a corresponding arrangement of the bores 7.1, for example arranged radially with a radial offset and/or an inclination with respect to the center line M, the secondary gas can be set in rotation. This serves to stabilize the arc or the plasma jet.

After it has passed through the secondary-gas conveying part 7, the secondary gas flows into an interior space 8.10 which is formed by the inner face of the nozzle protective cap 8 and the outer face of the nozzle 4, and then passes out of the bore 8.1 in the nozzle protective cap 8. With the arc or plasma jet burning, the secondary gas strikes the latter and can influence it.

The nozzle protective cap 8 is usually cooled only by the secondary gas SG. Gas cooling has the drawback that it is not effective for achieving acceptable cooling or dissipation of heat and the required gas volumetric flow is very high for this purpose. Gas volumetric flows of 5000 to 11 000 l/h are often necessary here. At the same time, the volumetric flow of the secondary gas has to be selected such that the best cutting results are achieved. Excessive volumetric flows, which are required for cooling, however, often impair the cutting result.

In addition, the high gas consumption brought about by the high volumetric flows is uneconomical. This applies particularly when gases other than air, for example argon, nitrogen, hydrogen, oxygen or helium, are used.

These drawbacks are remedied by the use of the insulating part configured as the secondary-gas conveying part 7. By using such an insulating part, electrical insulation is achieved between the nozzle protective cap 8 and the nozzle 4. In combination with the secondary gas SG, the electrical insulation protects the nozzle 4 and the nozzle protective cap 8 from arcs which can form between them and the workpiece. These are referred to as double arcs and can result in damage to the nozzle 4 or the nozzle protective cap 8.

At the same time, heat is transferred between the nozzle protective cap 8 and the nozzle 4 from the hotter to the colder component, in this case from the nozzle protective cap 8 to the nozzle 4, via the insulating part with good thermal conductivity that is configured as a secondary-gas conveying part 7. The secondary-gas conveying part 7 is in touching contact with the nozzle protective cap 8 and the nozzle 4. In this exemplary embodiment, this takes place via annular faces 8.2 of the nozzle protective cap 8 and 7.4 of the secondary-gas conveying part 7 and the annular faces 7.5 of the secondary-gas conveying part 7 and 4.4 of the nozzle 4. These are force-fitting connections, wherein the nozzle protective cap 8 with the aid of the nozzle protective cap holder 9 which is screwed by way of an internal thread 9.20 to an external thread 11.20 of a receptacle 11. Thus, this is pressed upwardly against the secondary-gas conveying part 7 and this is pressed against the nozzle 4.

In this way, the heat is conducted from the nozzle protective cap 8 to the nozzle 4 and thus cooled. The nozzle 4 for its part is indirectly cooled, as explained in the description of FIG. 1.

Figure 6:
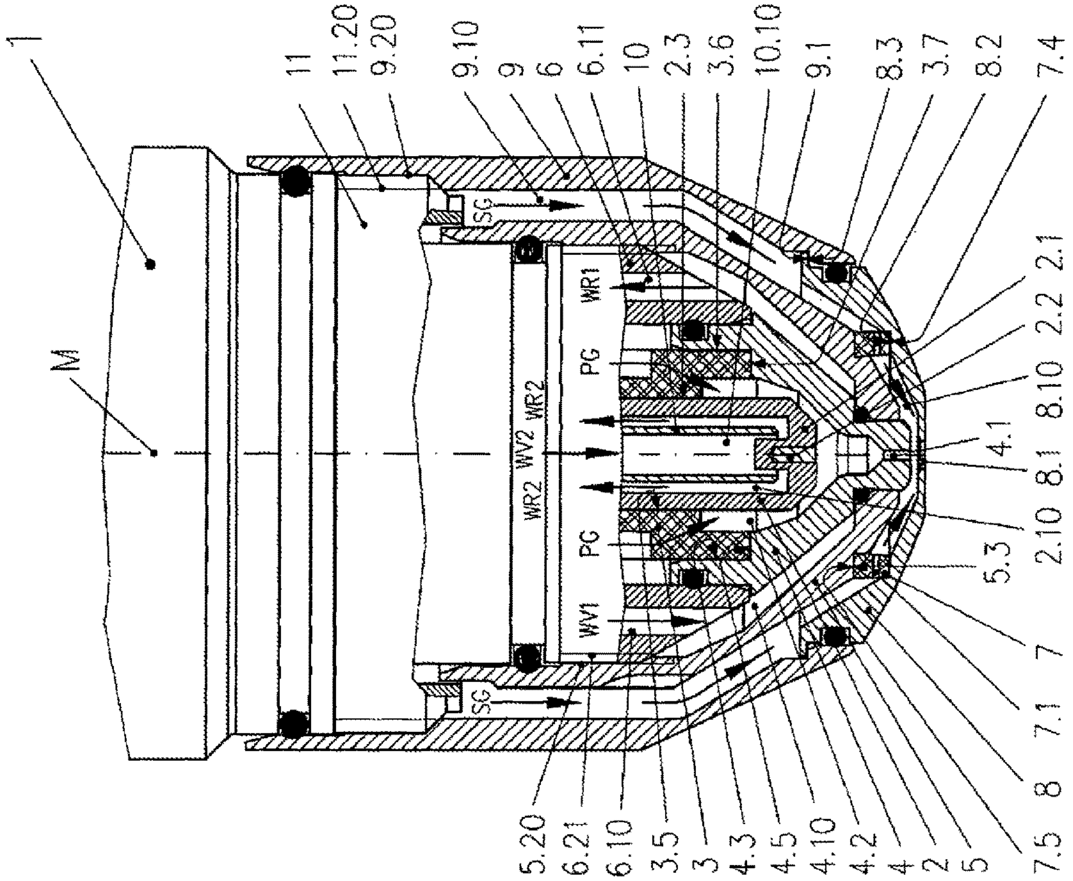
FIG. 6 shows a side view in partial longitudinal section of a plasma torch according to a sixth particular embodiment of the invention.

FIG. 6 shows the structure of the plasma cutting torch 1 as in FIG. 4, but in which a nozzle protective cap 8 is additionally arranged outside the nozzle cap 5.

Bores 4.1 in the nozzle 4 and 8.1 in the nozzle protective cap 8 are located on a center line M. The inner faces of the nozzle protective cap 8 and of the nozzle protective cap holder 9 form, with the outer faces of the nozzle cap 5 and of the nozzle 4, spaces 8.10 and 9.10, respectively, through which a secondary gas SG can flow. This secondary gas passes out of the bore 8.1 in the nozzle protective cap 8, encloses the plasma jet (not illustrated) and ensures a defined atmosphere around the latter. In addition, the secondary gas SG protects the nozzle 4, the nozzle cap 5 and the nozzle protective cap 8 from arcs which can form between them and the workpiece (not shown). These are referred to as double arcs and can result in damage to the nozzle 4, the nozzle cap 5 and the nozzle protective cap 8. In particular when piercing a workpiece, the nozzle 4, the nozzle cap 5 and the nozzle protective cap 8 are highly stressed by hot material splashing up. The secondary gas SG, the volumetric flow of which can be increased during piercing compared with the value during cutting, keeps the material splashing up away from the nozzle 4, the nozzle cap 5 and the nozzle protective cap 8 and thus protects them from damage.

For cooling the electrode 2, the nozzle 4 and the nozzle cap 5, the statements made in the description of FIG. 4 apply.

The nozzle protective cap 8 is heated in particular by the radiation of the arc or of the plasma jet and of the heated workpiece. In particular when piercing the workpiece, the nozzle protective cap 8 is highly thermally stressed and heated by red-hot material splashing up and has to be cooled. Therefore, materials with good thermal conductivity and good electrical conductivity, generally metals, for example copper, aluminum, tin, zinc, iron or alloys in which at least one of these metals is contained, are used therefor.

The secondary gas SG first of all flows through the plasma torch 1, before it passes through a space 9.10 which is formed by the inner faces of the nozzle protective cap holder 9 and of the nozzle protective cap 8 and the outer faces of a nozzle holder 6 and of the nozzle cap 5. The space 9.10 is also bounded by an insulating part, configured as a secondary-gas conveying part 7 for the secondary gas SG, which is located between the nozzle cap 5 and the nozzle protective cap 8.

Located in the secondary-gas conveying part 7 are bores 7.1. However, these can also be openings, grooves or cutouts through which the secondary gas SG flows. By way of a corresponding arrangement thereof, for example bores 7.1 with a radial offset and/or bores 7.1 arranged radially with an inclination with respect to the center line M, the secondary gas SG can be set in rotation. This serves to stabilize the arc or the plasma jet.

After it has passed through the secondary-gas conveying part 7, the secondary gas SG flows into the space (interior space) 8.10 which is formed by the inner face of the nozzle protective cap 8 and the outer face of the nozzle cap 5 and of the nozzle 4, and then passes out of the bore 8.1 in the nozzle protective cap 8. With the arc or plasma jet burning, the secondary gas SG strikes the latter and can influence it.

The nozzle protective cap 8 is usually cooled only by the secondary gas SG. Gas cooling has the drawback that it is not effective for achieving acceptable cooling or dissipation of heat and the required gas volumetric flow is very high for this purpose. Gas volumetric flows of 5000 to 11 000 l/h are often necessary here. At the same time, the volumetric flow of the secondary gas has to be selected such that the best cutting results are achieved. Excessive volumetric flows, which are required for cooling, however, often impair the cutting result. In addition, the high gas consumption brought about by high volumetric flows is uneconomical. This applies particularly when gases other than air, for example argon, nitrogen, hydrogen, oxygen or helium, are used. These drawbacks are remedied by the use of the insulating part configured as the secondary-gas conveying part 7. By using such an insulating part, electrical insulation is achieved between the nozzle protective cap 8 and the nozzle cap 5 and thus also the nozzle 4. In combination with the secondary gas SG, the electrical insulation protects the nozzle 4, the nozzle cap 5 and the nozzle protective cap 8 from arcs which can form between them and a workpiece (not shown). These are referred to as double arcs and can result in damage to the nozzle, nozzle cap and nozzle protective cap.

At the same time, heat is transferred between the nozzle protective cap 8 and the nozzle cap 5 from the hotter to the colder component, in this case from the nozzle protective cap 8 to the nozzle cap 5, via the insulating part with good thermal conductivity that is configured as a secondary-gas conveying part 7. The secondary-gas conveying part 7 is in touching contact with the nozzle protective cap 8 and the nozzle cap 5. In this exemplary embodiment, this takes place via annular faces 8.2 of the nozzle protective cap 8 and 7.4 of the secondary-gas conveying part 7 and the annular faces 7.5 of the secondary-gas conveying part 7 and 5.3 of the nozzle cap 5. In this example, these are force-fitting connections, wherein the nozzle protective cap 8 is screwed by way of an internal thread 9.20 to an external thread 11.20 of a receptacle 11 with the aid of the nozzle protective cap holder 9. Thus, this is pressed upwardly against the secondary-gas conveying part 7 for the secondary gas SG and this is pressed against the nozzle cap 5. In this way, the heat is conducted from the nozzle protective cap 8 to the nozzle cap 5 and thus cooled. The nozzle cap 5 for its part is cooled as explained in the description of FIG. 4.

Figure 7:
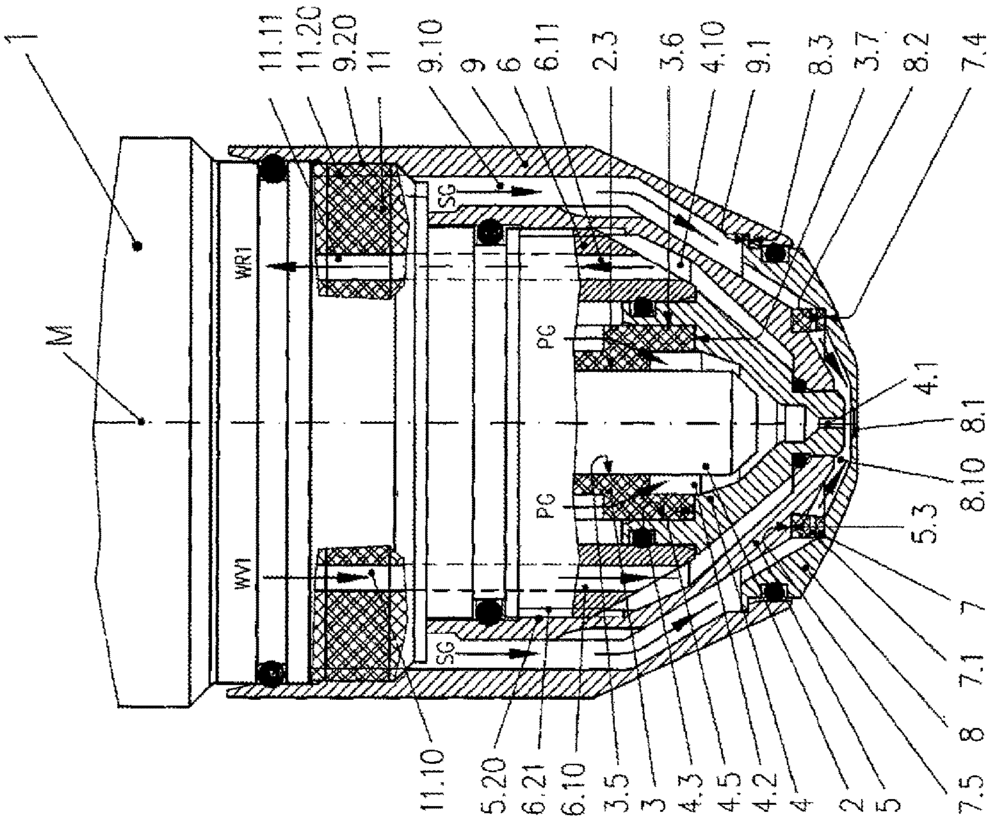
FIG. 7 shows a side view in partial longitudinal section of a plasma torch according to a seventh particular embodiment of the invention.

FIG. 7 shows a plasma cutting torch 1 for which the statements made with respect to the embodiment according to FIG. 6 apply. In addition, the nozzle protective cap holder 9 is screwed by way of its internal thread 9.20 to an external thread 11.20 of the receptacle 11, which is designed as an insulating part. The receptacle 11 consists of an electrically nonconductive material with good thermal conductivity. Thus, heat is transferred to the receptacle 11 from the nozzle protective cap holder 9, which can receive said heat for example from the nozzle protective cap 8, from a hot workpiece or from the arc radiation, via the internal thread 9.20 and the external thread 11.20. The receptacle 11 has coolant passages 11.10 and 11.11 for the coolant feed line (WV1) and coolant return line (WR1), which are embodied here as bores. The coolant flows through the latter and in this way cools the receptacle 11. Thus, the cooling of the nozzle protective cap holder 9 is further improved. The heat is transferred from the nozzle protective cap 8, via the contact face 8.3 thereof, configured as an annular face, to a contact face 9.1, likewise configured as an annular face, on the nozzle protective cap holder 9. The contact faces 8.3 and 9.1 touch one another in a force-fitting manner in this example, wherein the nozzle protective cap 8 is screwed by way of the internal thread 9.20 to the external thread 11.20 of the receptacle 11 with the aid of the nozzle protective cap holder 9. Thus, this is pressed upward against the secondary-gas conveying part 7 and the nozzle protective cap holder 9 is pressed against the nozzle protective cap 8. In the present example, the receptacle 11 is produced from ceramic. Aluminum nitride, which has very good thermal conductivity (about 180 W/(m*K)) and high electrical resistivity (about $10^{12}$ Ω*cm) is particularly suitable.

Coolant is simultaneously conveyed to the nozzle 4 and nozzle cap 5 through coolant spaces 6.10 and 6.11 in the nozzle holder 6 and cools said nozzle 4 and nozzle cap 5.

Figure 8:
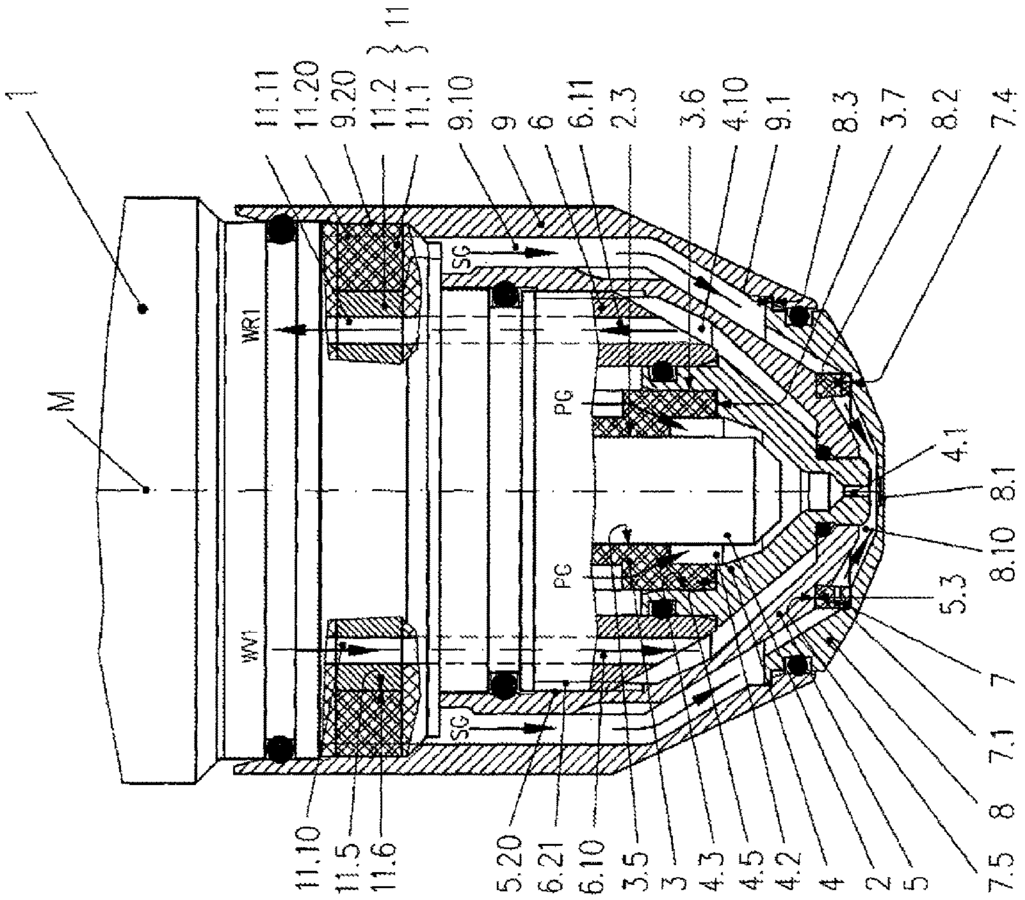
FIG. 8 shows a side view in partial longitudinal section of a plasma torch according to an eighth particular embodiment of the invention.

FIG. 8 shows an embodiment of a plasma torch 1 which is similar to the one in FIG. 7. Thus, the statements made with respect to the embodiment according to FIGS. 6 and 7 also apply in principle. However, it contains a different embodiment of the insulating part embodied as a receptacle 11 for the nozzle protective cap holder 9. The receptacle 11 consists of two parts in this example, wherein an outer part 11.1 consists of an electrically nonconductive material with good thermal conductivity and an inner part 11.2 consists of a material with good electrical conductivity and good thermal conductivity.

The nozzle protective cap holder 9 is screwed by way of its internal thread 9.20 to the external thread 11.20 of the part 11.1 of the receptacle 11.

The electrically nonconductive material with good thermal conductivity is produced from ceramic, for example aluminum nitride, which has very good thermal conductivity (about 180 W/(m*K)) and high electrical resistivity, about $10^{12}$ Ω*cm. The material with good electrical conductivity and good thermal conductivity is in this case a metal, for example copper, aluminum, tin, zinc, alloyed steel or alloys (for example brass) in which at least one of these metals is contained.

Generally, it is advantageous for the material with good electrical conductivity and good thermal conductivity to have a thermal conductivity of at least 40 W/(m*K)Ω and electrical resistivity of at most 0.01 Ω*cm. In particular, provision can be made here for the material with good electrical conductivity and good thermal conductivity to have a thermal conductivity of at least 60 W/(m*K), better still at least 90 W/(m*K) and preferably 120 W/(m*K). Even more preferably, the material with good electrical conductivity and good thermal conductivity has a thermal conductivity of at least 150 W/(m*K), better still at least 200 W/(m*K) and preferably at least 300 W/(m*K). Alternatively or in addition, provision can be made for the material with good electrical conductivity and good thermal conductivity to be a metal, for example silver, copper, aluminum, tin, zinc, iron, alloyed steel or a metal alloy (for example brass) in which these metals are contained individually or in a total amount of at least 50%.

The use of two different materials has the advantage that, for the complicated part in which different formations are required, for example different bores, cutouts, grooves, openings etc., the material which can be machined more easily and more cost-effectively can be used. In this exemplary embodiment, this is a metal which can be machined more easily than ceramic. Both parts (11.1 and 11.2) are connected together in touching contact in a force-fitting manner by being pressed into one another, with the result that good heat transfer between the cylindrical contact faces 11.5 and 11.6 of the two parts 11.1 and 11.2 is achieved. The part 11.2 of the receptacle 11 has coolant passages 11.10 and 11.11 for the coolant feed line (WV1) and coolant return line (WR1), these being embodied here as bores. The coolant flows through the latter and in this way carries out its cooling action.

As can be gathered from FIG. 8 and the associated description, the present invention also relates to an insulating part for a plasma torch, in particular a plasma cutting torch, for electrical insulation between at least two electrically conductive components of the plasma torch, wherein said insulating part consists of at least two parts, wherein one of the parts consists of an electrically nonconductive material with good thermal conductivity and the other or one other of the parts consists of a material with good electrical conductivity and good thermal conductivity.

Figure 9:
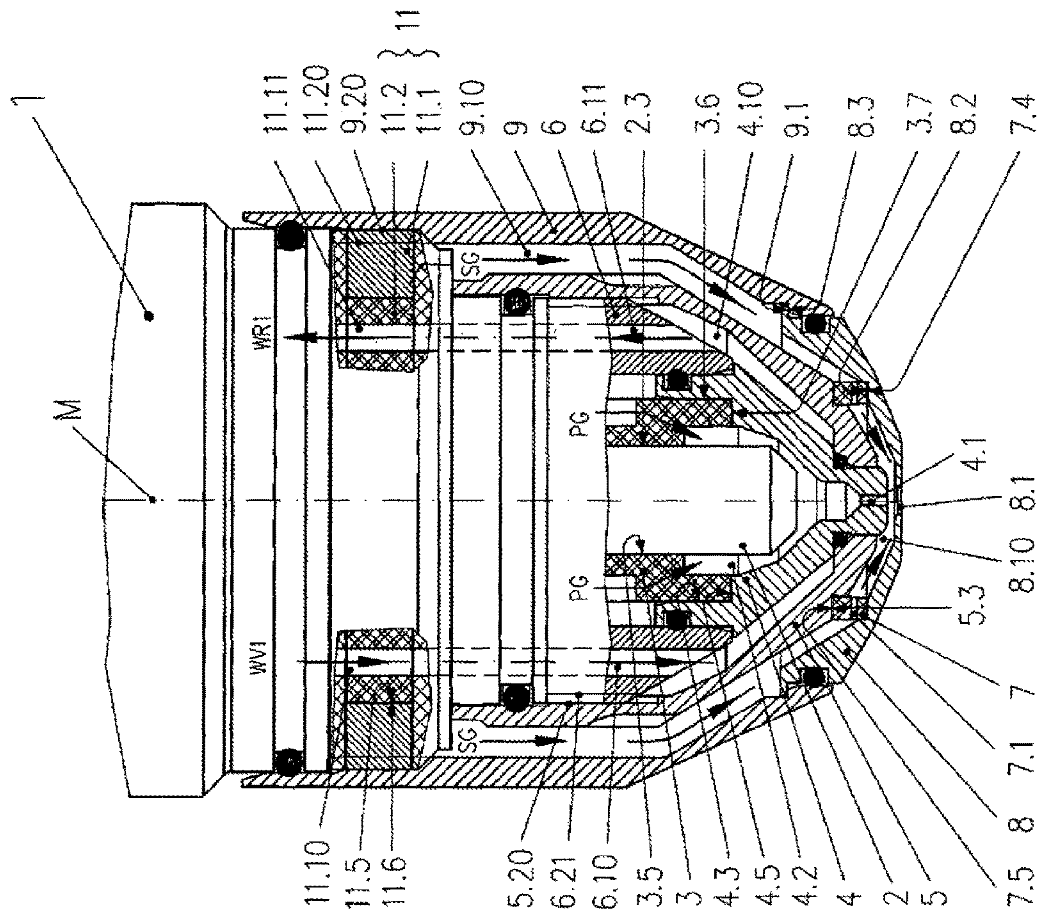
FIG. 9 shows a side view in partial longitudinal section of a plasma torch according to a ninth particular embodiment of the invention.

FIG. 9 shows a further embodiment of a plasma cutting torch 1 according to the present invention, which is similar in principle to the embodiment shown in FIG. 8. Thus, the statements made with respect to the embodiments according to FIGS. 6, 7 and 8 also apply. However, a different embodiment variant of the insulating part embodied as a receptacle 11 for the nozzle protective cap holder 9 is shown. The receptacle 11 consists of two parts, wherein in this case the outer part 11.1, in contrast to the embodiment shown in FIG. 8, consists of a material with good electrical conductivity and good thermal conductivity (for example metal) and the inner part 11.2 consists of an electrically nonconductive material with good thermal conductivity (for example ceramic).

The nozzle protective cap holder 9 is screwed by way of its internal thread 9.20 to the external thread 11.20 of the part 11.1 of the receptacle 11.

In this embodiment, the advantage is that the external thread can be introduced into the metal material, which is used for the part 11.1, and not the ceramic, which is harder to machine.

FIGS. 10 to 13 show (further) different embodiments of an insulating part configured as a plasma-gas conveying part 3 for the plasma gas PG, it being possible to implement said embodiments in a plasma torch 1, as is shown in FIGS. 1 to 9, wherein each figure with the letter "a" shows a longitudinal section and each figure with the letter "b" shows a side view in partial section.

Figure 10B:
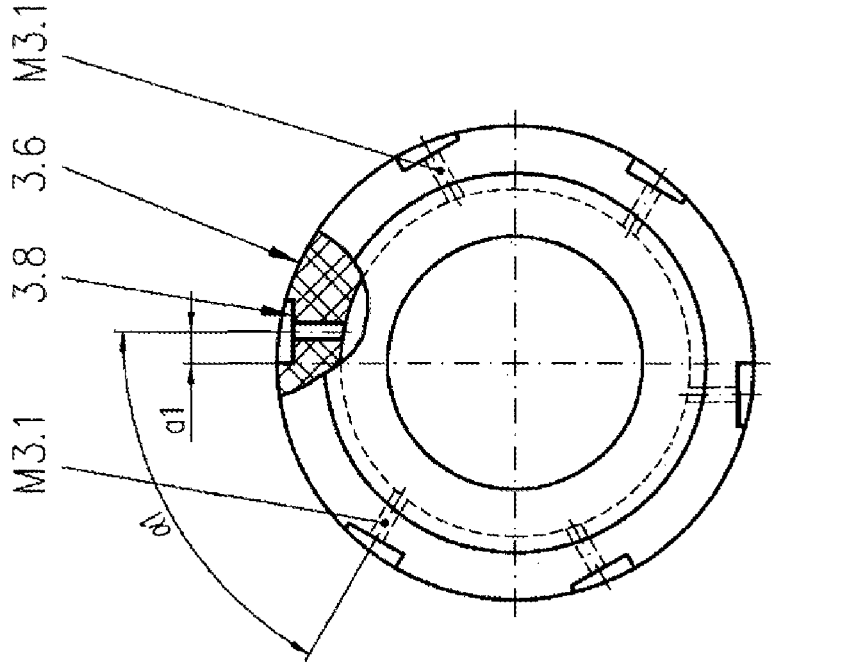
FIGS. 10*a* and 10*b* show a view in longitudinal section and a partially sectional side view of an insulating part according to one particular embodiment of the invention.
Figure 10A:
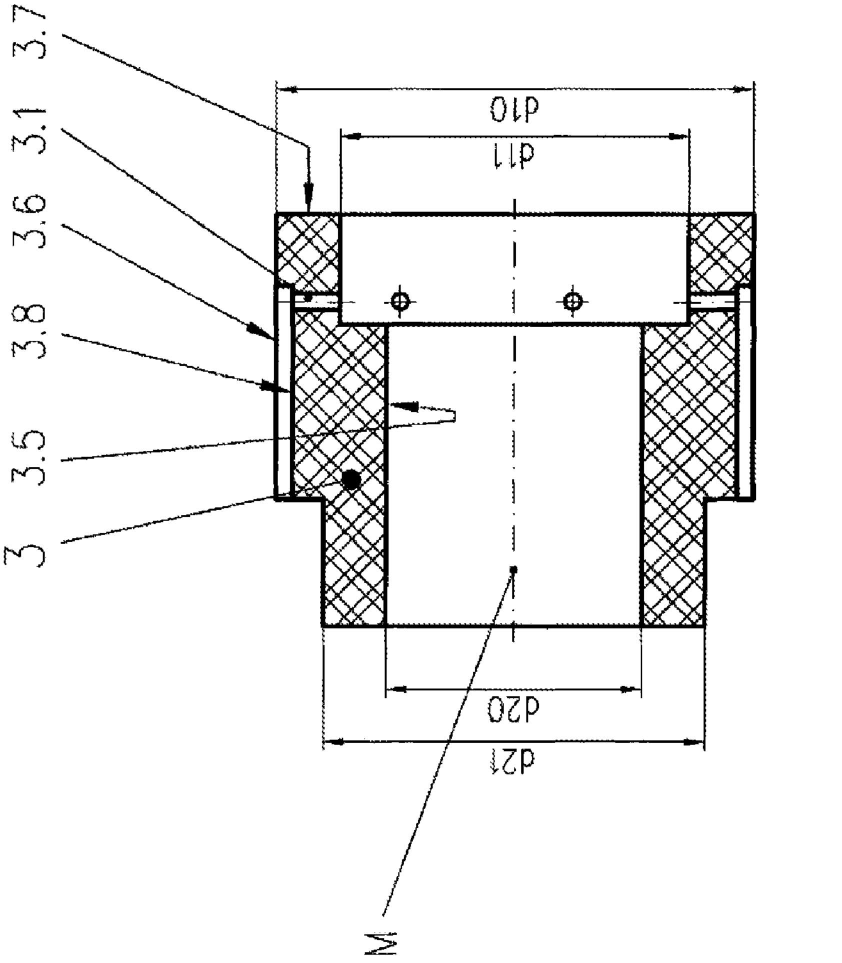

The plasma-gas conveying part 3 shown in FIGS. 10*a* and 10*b* is produced from an electrically nonconductive material with good thermal conductivity, for example ceramic in this case. Aluminum nitride, which has very good thermal conductivity (about 180 W/(m*K)) and high electrical resistivity (about $10^{12}$ Ω*cm) is particularly suitable. The associated advantages when used in a plasma cutting torch 1, for example better cooling, reduction in mechanical tensions, simpler structure, have already been mentioned and explained above in the description of FIGS. 1 to 4.

Located in the plasma-gas conveying part 3 are radially arranged bores 3.1 which can be for example radially offset and/or radially inclined with respect to the center line M and cause a plasma gas PG to rotate in the plasma cutting torch. When the plasma-gas conveying part 3 has been fitted into the plasma cutting torch 1, its contact face 3.6 (cylindrical outer face here, for example) is in touching contact with the contact face 4.3 (cylindrical inner face here, for example) of the nozzle 4, its contact face 3.5 (cylindrical inner face here, for example) is in touching contact with the contact face 2.3 (cylindrical outer face here, for example) of the electrode 2, and its contact face 3.7 (annular face here, for example) is in touching contact with the contact face 4.5 (annular face here, for example) of the nozzle 4 (FIGS. 1 to 9). In the contact face 3.6, there are grooves 3.8. These guide the plasma gas PG to the bores 3.1 before it is conveyed by the latter into an interior space 4.2 in the nozzle 4, in which the electrode 2 is arranged.

Figure 11A:
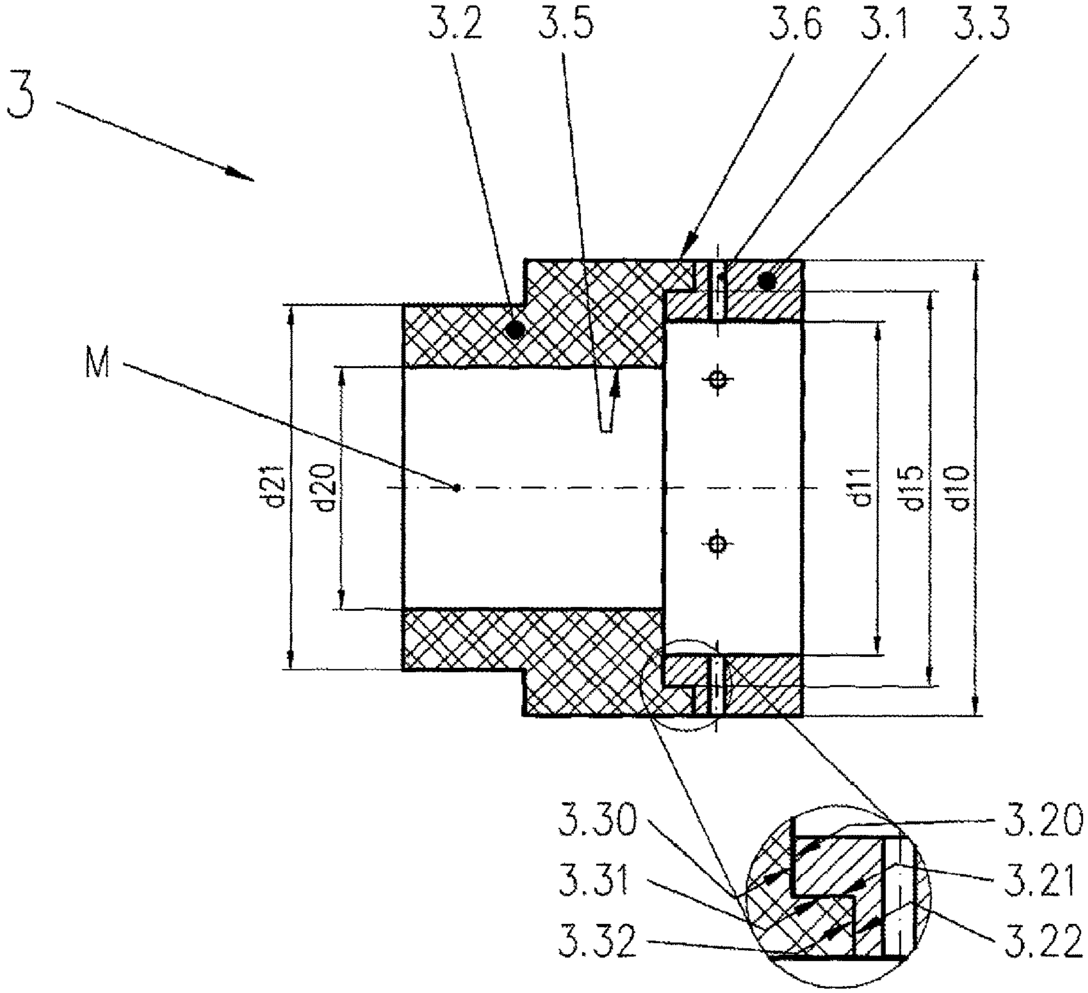
FIGS. 11*a* and 11*b* show a view in longitudinal section and a partially sectional side view of an insulating part according to a further particular embodiment of the invention.
Figure 11B:
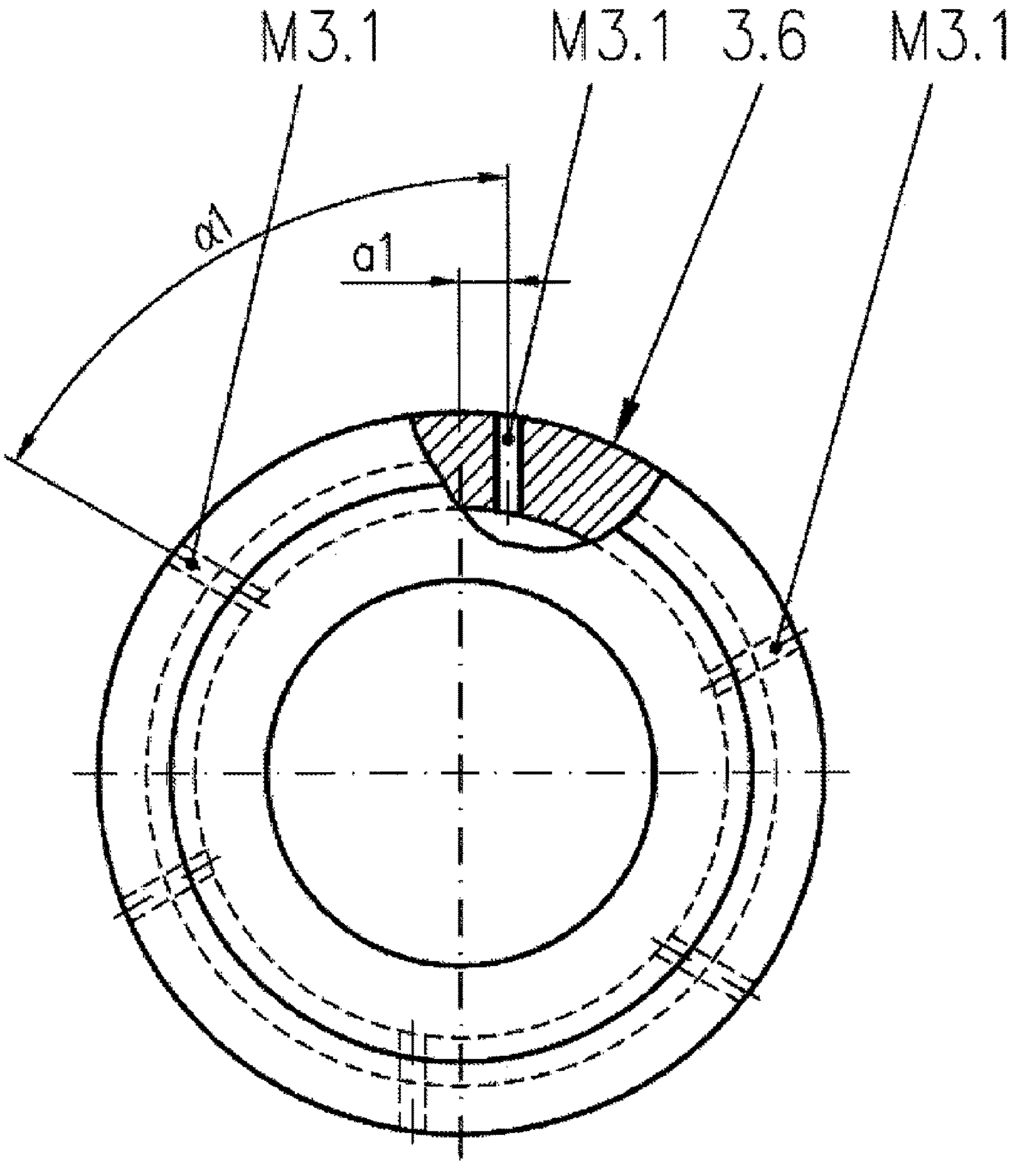

FIGS. 11*a* and 11*b* show a plasma-gas conveying part 3 which consists of two parts. A first part 3.2 consists of an electrically nonconductive material with good thermal conductivity, while a second part 3.3 consists of a material with good electrical conductivity and good thermal conductivity.

For the part 3.2 of the plasma-gas conveying part 3, use is made here for example of ceramic, again for example aluminum nitride, which has very good thermal conductivity (about 180 W/(m*K)) and high electrical resistivity ($10^{12}$ Ω*cm). For the part 3.3 of the secondary-gas conveying part 3, use is made here of a metal, for example silver, copper, aluminum, tin, zinc, iron, alloyed steel or a metal alloy (for example brass) in which these metals are contained individually or in a total amount of at least 50%.

If for example copper is used for the part 3.3, the thermal conductivity of the plasma-gas conveying part 3 is greater than if it only consisted of an electrically nonconductive material with good thermal conductivity, for example aluminum nitride. Depending on its purity, copper has greater thermal conductivity (max. about 390 W/(m*K)) than aluminum nitride (about 180 W/(m*K)), which is currently considered to be one of the best thermally conducting materials which does not simultaneously have good electrical conductivity. In the meantime, there is also aluminum nitride with a thermal conductivity of 220 W/(m*K).

On account of the better thermal conductivity, this results in even better heat exchange between the nozzle 4 and the electrode 2 of the plasma cutting torch 1 according to FIGS. 1 to 9.

In the simplest case, the parts 3.2 and 3.3 are connected together by the contact faces 3.21 and 3.31 being pushed one over the other.

The parts 3.2 and 3.3 can also be connected in a force-fitting manner by way of the pressed-together, opposing and touching contact faces 3.20 and 3.30, 3.21 and 3.31, and 3.22 and 3.32. The contact faces 3.20, 3.21 and 3.22 are contact faces of the part 3.2 and the contact faces 3.30, 3.31 and 3.32 are contact faces of the part 3.3. The cylindrically configured contact faces 3.31 (cylindrical outer face of the part 3.3) and 3.21 (cylindrical inner face of the part 3.2) form a force-fitting connection by being pressed into one another. In this case, an interference fit DIN EN ISO 286 (for example H7/n6; H7/m6) is used between the cylindrical inner and outer faces.

It is also possible to connect the two parts (3.2 and 3.3) together by way of a form fit, by soldering and/or by adhesive bonding and/or by way of a thermal method.

Since the mechanical machining of the ceramic material is usually more difficult than that of a metal, the machining complexity drops. Here, for example six bores 3.1 have been introduced into the metal part 3.3, said bores having a radial offset a1 and being distributed equidistantly at an angle α1 around the circumference of the plasma-gas duct. Very different formations, for example grooves, cutouts, bores etc., are also easier to produce when they are introduced into the metal.

Figure 12A:
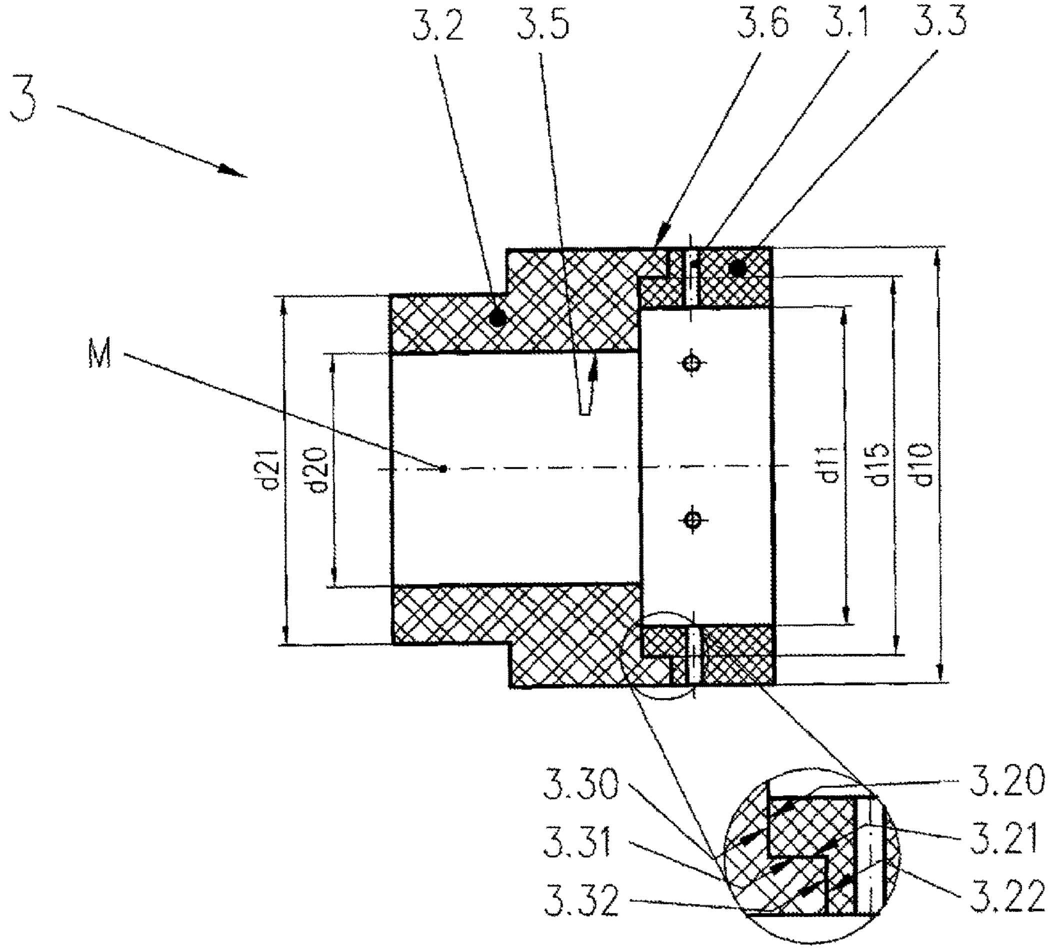
FIGS. 12*a* and 12*b* show a view in longitudinal section and a partially sectional side view of an insulating part according to a further particular embodiment of the invention.
Figure 12B:
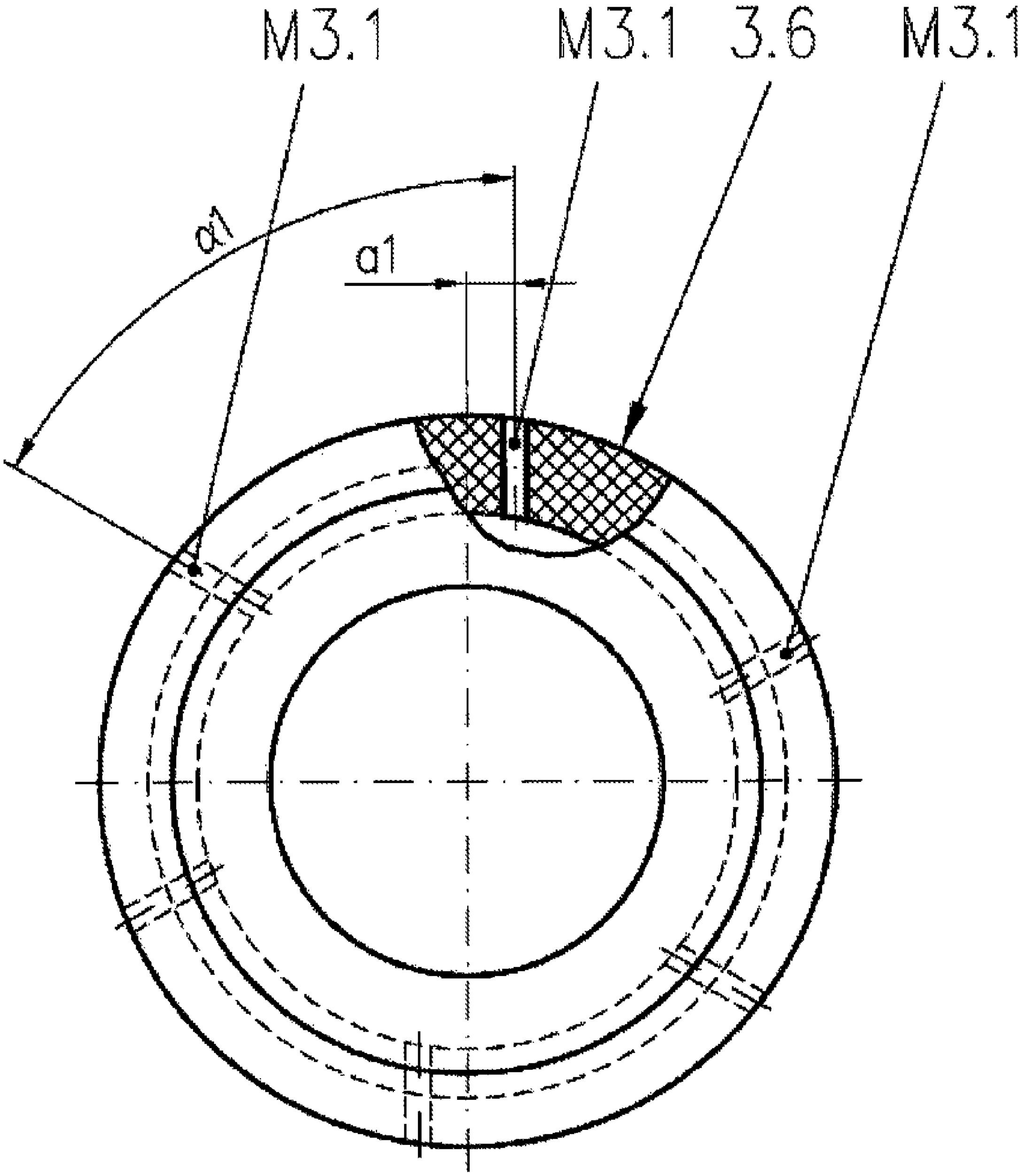

FIGS. 12*a* and 12*b* show a plasma-gas conveying part 3 which consists of two parts, wherein a first part 3.2 consists of an electrically nonconductive material with good thermal conductivity, while a second part 3.3 consists of an electrically nonconductive and thermally nonconductive material.

For the part 3.2 of the plasma-gas conveying part 3, use is made here for example of ceramic, again for example aluminum nitride, which has very good thermal conductivity (about 180 W/(m*K)) and high electrical resistivity ($10^{12}$ Ω*cm). For the part 3.3 of the plasma-gas conveying part 3, use can be made for example of a plastics material, for example PEEK, PTFE (polytetrafluoroethylene), Torlon, polyamide-imide (PAI), polyimide (PI), which has high temperature stability (at least 200° C.) and high electrical resistivity (at least $10^6$, better still at least $10^{10}$ Ω*cm).

In the simplest case, the parts 3.2 and 3.3 are connected together by the contact faces 3.21 and 3.31 being pushed one over the other. They can also be connected in a force-fitting manner by way of the pressed-together, opposing and touching contact faces 3.20 and 3.30, 3.21 and 3.31, and 3.22 and 3.32. The cylindrically configured contact faces 3.31 (cylindrical outer face of the part 3.3) and 3.21 (cylindrical inner face of the part 3.2) then form the force-fitting connection by being pressed into one another. In this case, an interference fit DIN EN ISO 286 (for example H7/n6; H7/m6) is used between the cylindrical inner and outer faces. It is also possible to connect the two parts (3.2 and 3.3) together by way of a form fit and/or by adhesive bonding.

Since the mechanical machining of the ceramic material is usually more difficult than that of a plastics material, the machining complexity drops. Here, for example six bores 3.1 have been introduced into the plastics part 3.3, said bores having a radial offset a1 and being distributed equidistantly at an angle α1 around the circumference of the gas duct. Very different formations, for example grooves, cutouts, bores etc., are also easier to produce when they are introduced into the plastics material.

Figure 13A:
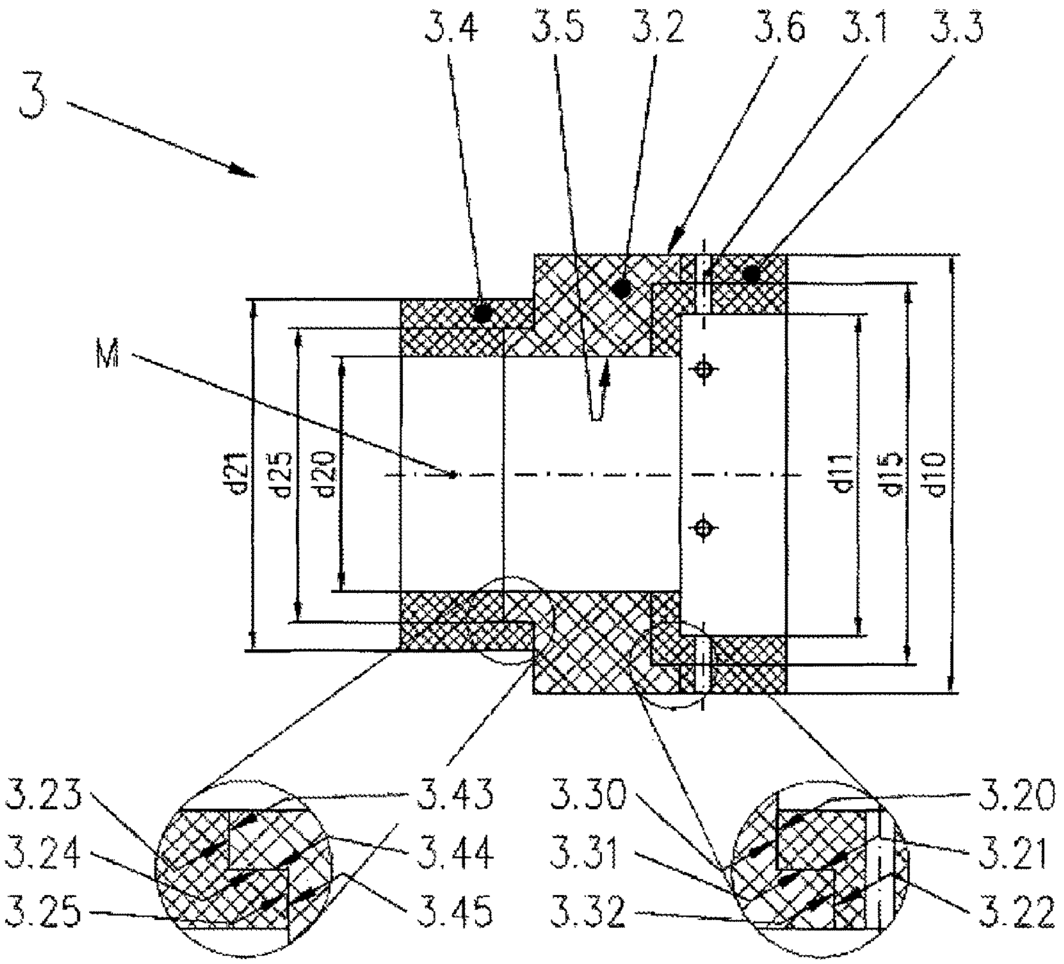
FIGS. 13*a* and 13*b* show a view in longitudinal section and a partially sectional side view of an insulating part according to a further particular embodiment of the invention.
Figure 13B:
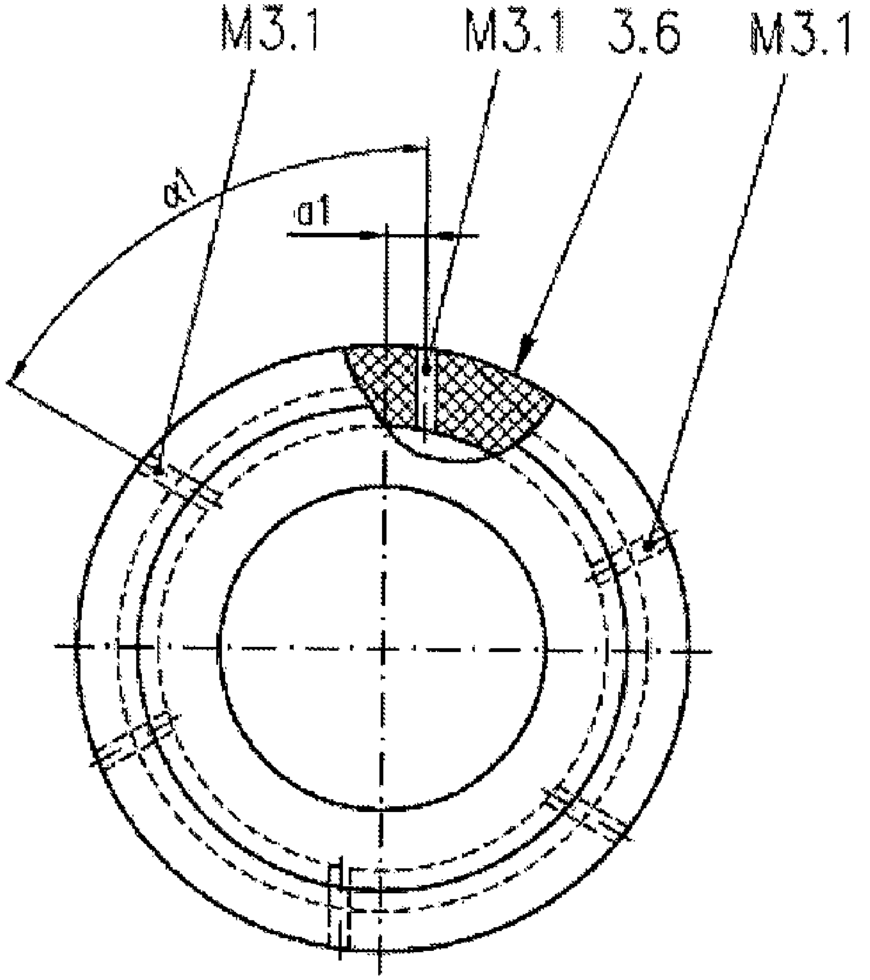

FIGS. 13*a* and 13*b* show a plasma-gas conveying part 3 as in FIG. 12, except that a further part 3.4, which consists of a material with the same properties as the part 3.3, belongs to the plasma-gas conveying part 3.

The parts 3.2 and 3.4 can be connected together in the same way as the parts 3.2 and 3.3, wherein the contact faces 3.23 and 3.43, 3.24 and 3.44, and 3.25 and 3.25 are connected.

Since the mechanical machining of the ceramic material is usually more difficult than that of a plastics material, the machining complexity drops and very different formations, for example cutouts, bores etc., are also easier to produce when they are introduced into the plastics material.

Figure 14B:
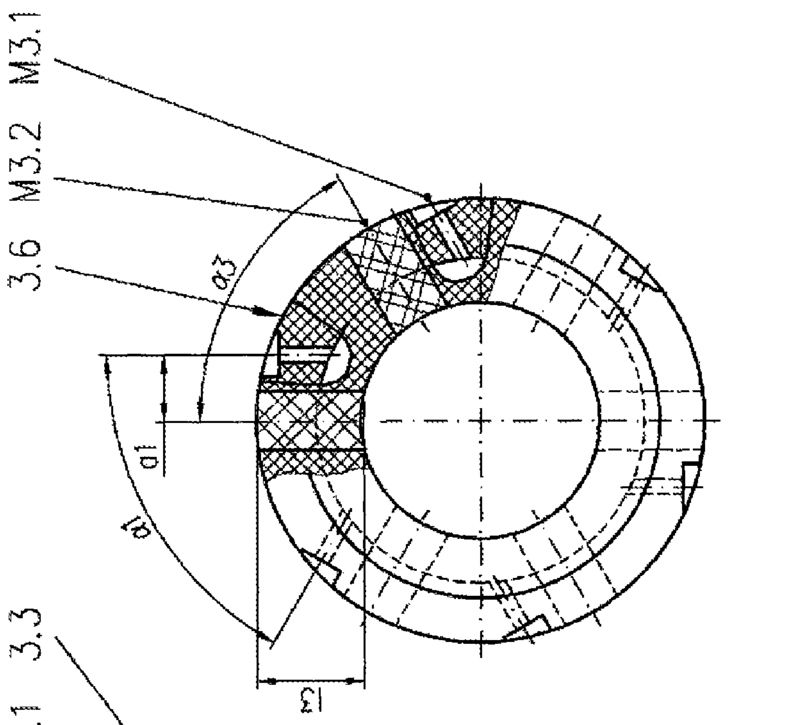
FIGS. 14*a* and 14*b* show a view in longitudinal section and a partially sectional side view of an insulating part according to a further particular embodiment of the invention.
Figure 14A:
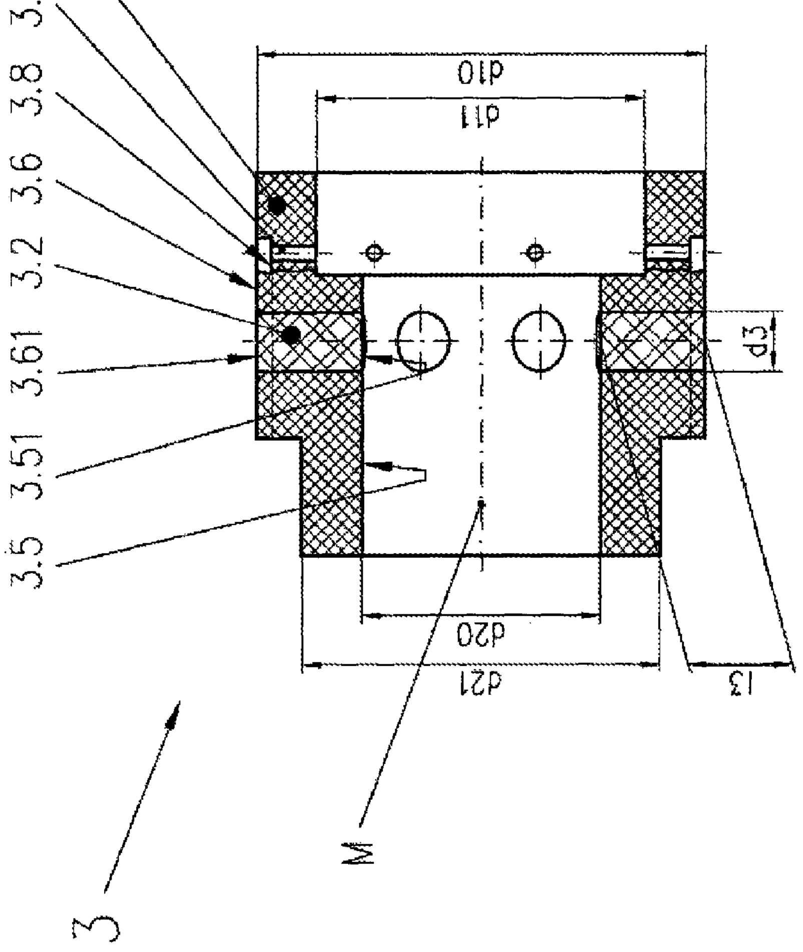
Figure 14D:
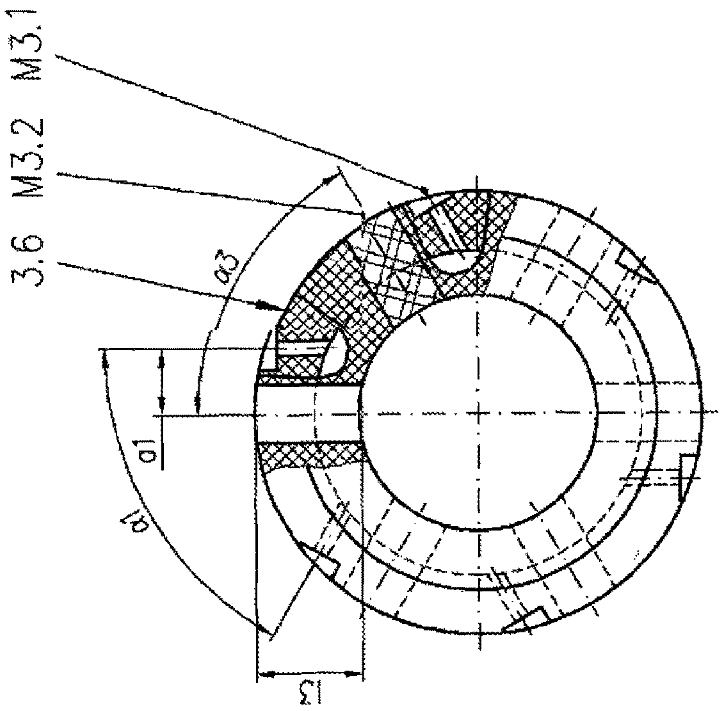
FIGS. 14*c* and 14*d* show views as in FIGS. 14*a* and 14*b*, but wherein a part has been omitted.
Figure 14C:
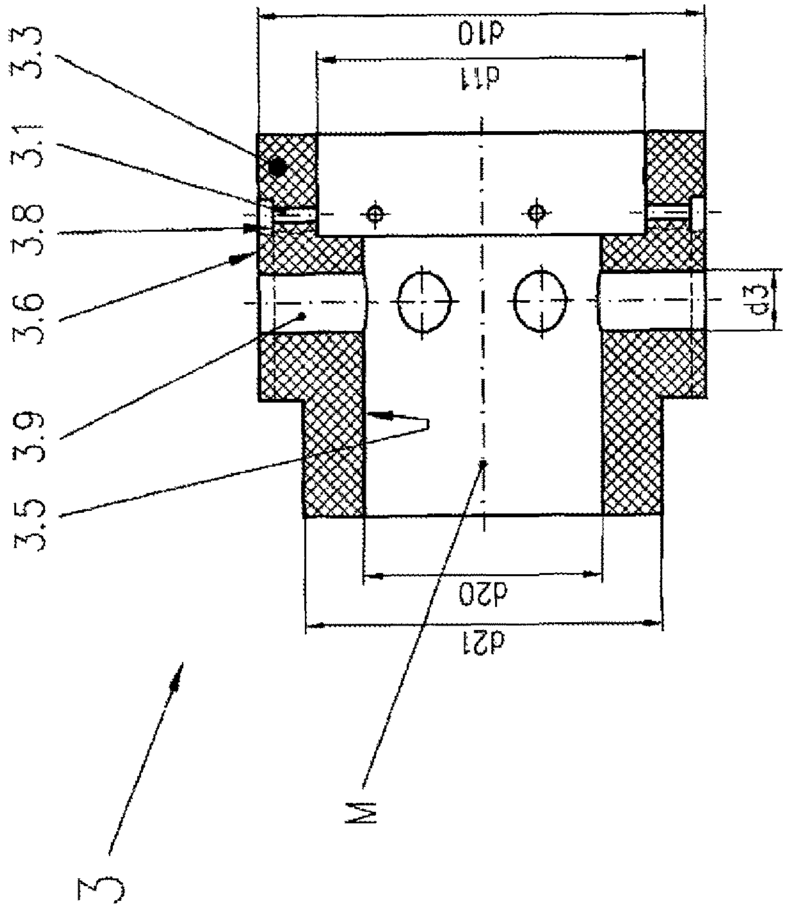

FIGS. 14*a* to 14*b* show a further embodiment of a plasma-gas conveying part 3. FIGS. 14*c* and 14*d* show a part 3.3 of the plasma-gas conveying part 3. In this case, FIGS. 14*a* and 14*c* show a longitudinal section and FIGS. 14*b* and 14*d* show a side view in partial section.

A part 3.2 consists of an electrically nonconductive material with good thermal conductivity, while a part 3.3 consists of an electrically nonconductive and thermally nonconductive material.

Located in the part 3.3 of the plasma-gas conveying part 3 are radially arranged openings, in this case bores 3.1, which can be radially offset and/or radially inclined with respect to the center line M and through which a plasma gas PG flows when the plasma-gas conveying part 3 has been fitted in the plasma cutting torch 1 (see FIGS. 1 to 9).

The part 3.3 has further radially arranged bores 3.9 which are larger than the bores 3.1. Introduced into these bores are six parts 3.2 which are illustrated here for example as round pins. These are distributed equidistantly around the circumference at an angle, which results between midpoint lines M3.9, of α3=60°.

When the plasma-gas conveying part 3 has been fitted in the plasma cutting torch 1 according to FIGS. 1 to 9, contact faces 3.61 (outer faces) of the parts 3.2 (round pins) are in touching contact with a contact face 4.3 (a cylindrical inner face here) of the nozzle 4 and contact faces 3.51 (inner faces) of the parts 3.2 (round pins) are in touching contact with the contact face 2.3 (a cylindrical outer face here) of the electrode 2.

The parts 3.2 have a diameter d3 and a length l3 which is at least as great as half the difference of the diameters d10 and d20 of the part 3.3. It is even better when the length l3 is slightly greater in order to obtain secure contact between the contact faces of the round pins 3.2 and the nozzle 4 and the electrode 2. It is also advantageous for the surface of the contact faces 3.61 and 3.51 not to be planar, but to be adapted to the cylindrical outer face (contact face 2.3) of the electrode 2 and to the cylindrical inner face (contact face 4.3) of the nozzle 4 such that a form fit is produced.

In the contact face 3.6, there are grooves 3.8. These guide the plasma gas PG to the bores 3.1 before it is conveyed by the latter into an interior space 4.2 in the nozzle 4, in which the electrode 2 is arranged.

Since the mechanical machining of the ceramic material is usually more difficult than that of a plastics material, the machining complexity drops and very different formations, for example grooves, cutouts, bores etc., are also easier to produce when they are introduced into the plastics material. Thus, in spite of the use of identical round pins, very different gas ducts can be produced in a cost-effective manner.

Furthermore, by changing the number or the diameter of the round pins 3.2, different thermal resistances or thermal conductivities of the plasma-gas conveying part 3 are achievable.

If the diameter and/or the number of round pins is/are reduced, the thermal resistance increases and the thermal conductivity drops.

Since very different thermal loads arise at the nozzle 4 and the electrode 2 depending on the power of 500 W to 200 kW to be implemented in the plasma torch or plasma cutting torch, it is advantageous to adapt the thermal resistance. Thus, for example the manufacturing costs are reduced when fewer bores have to be introduced and fewer round pins have to be used.

FIGS. 15 to 17 show (further) different embodiments of an insulating part configured as a secondary-gas conveying part 7 for a secondary gas SG, it being possible to implement said embodiments in a plasma cutting torch 1, as is shown in FIGS. 6 to 9, wherein each figure with the letter "a" shows a plan view in partial section and each figure with the letter "b" shows a side view in section.

Figure 15B:
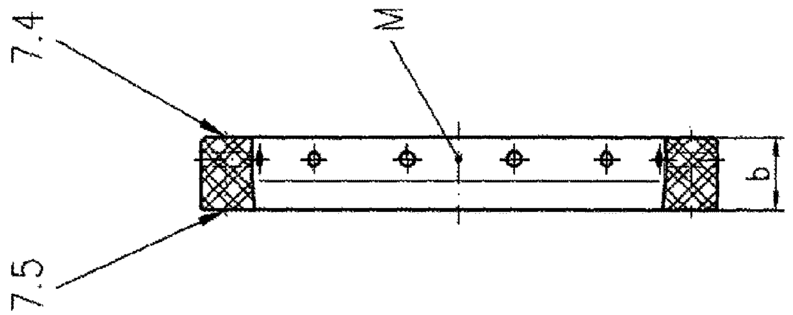
FIGS. 15*a* and 15*b* show a plan view in partial section and a side view in partial section, respectively, of an insulating part which is or can be used, for example, in the plasma torch in FIGS. 6 to 9.
Figure 15A:
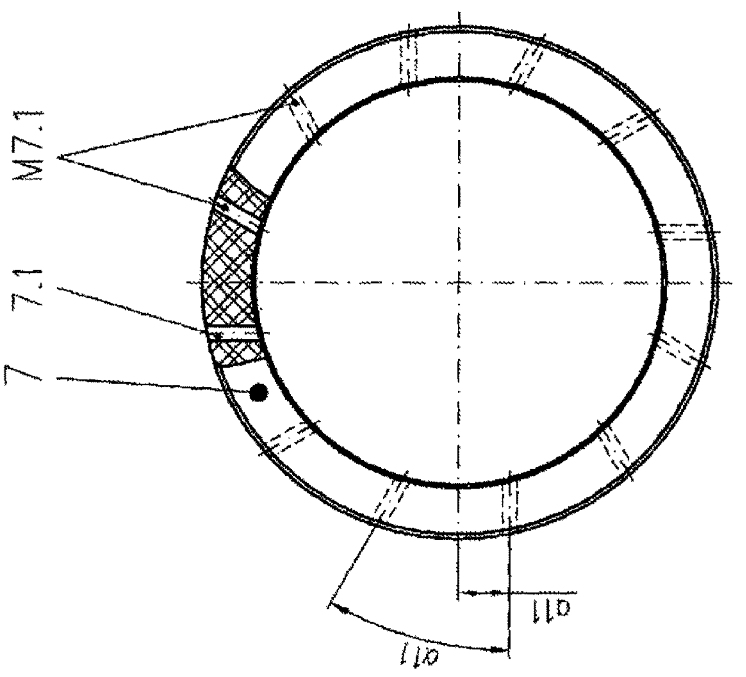

FIGS. 15*a* and 15*b* show a secondary-gas conveying part 7 for a secondary gas SG, as can be used in a plasma cutting torch according to FIGS. 6 to 9.

The secondary-gas conveying part 7 shown in FIGS. 15*a* and 15*b* consists of an electrically nonconductive material with good thermal conductivity, for example ceramic in this case. Aluminum nitride, which has very good thermal conductivity (about 180 W/(m*K)) and high electrical resistivity (about $10^{12}$ Ω*cm) is particularly suitable again here. As a result of the low thermal resistance and high thermal conductivity, large temperature differences can be avoided and mechanical tensions in the plasma cutting torch that are caused thereby can be reduced.

Located in the secondary-gas conveying part 7 are radially arranged bores 7.1 which can also be radial or radially offset and/or radially inclined with respect to the center line M and through which the secondary gas SG can flow or flows when the secondary-gas conveying part 7 has been fitted in the plasma cutting torch 1. In this example, 12 bores are radially offset by a dimension a11 and are distributed equidistantly around the circumference, wherein the angle which is enclosed by the midpoints of the bores is denoted α11. However, there may also be openings, grooves or cutouts through which the secondary gas SG flows when the secondary-gas conveying part 7 has been fitted in the plasma cutting torch 1. The secondary-gas conveying part 7 has two annular contact faces 7.4 and 7.5.

By using this secondary-gas conveying part 7, electrical insulation is achieved between the nozzle protective cap 8 and the nozzle cap 5 and thus also the nozzle 4 of the plasma cutting torch 1 illustrated in FIGS. 6 to 9. In combination with the secondary gas, the electrical insulation protects the nozzle 4, the nozzle cap 5 and the nozzle protective cap 8 from arcs which can form between them and the workpiece (not shown). These are referred to as double arcs and can result in damage to the nozzle 4, the nozzle cap 5 and the nozzle protective cap 8.

At the same time, heat is transferred between the nozzle protective cap 8 and the nozzle cap 5 from the hotter to the colder component, in this case from the nozzle protective cap 8 to the nozzle cap 5, via the insulating part with good thermal conductivity that is configured as a secondary-gas conveying part 7. The secondary-gas conveying part 7 is in touching contact with the nozzle protective cap 8 and the nozzle cap 5. In this exemplary embodiment, this takes place via annular faces 8.2 of the nozzle protective cap 8 and 7.4 of the secondary-gas conveying part 7 and annular faces 7.5 of the secondary-gas conveying part 7 and 5.3 of the nozzle cap 5, which touch, as illustrated in FIGS. 6 to 9.

Figure 16A:
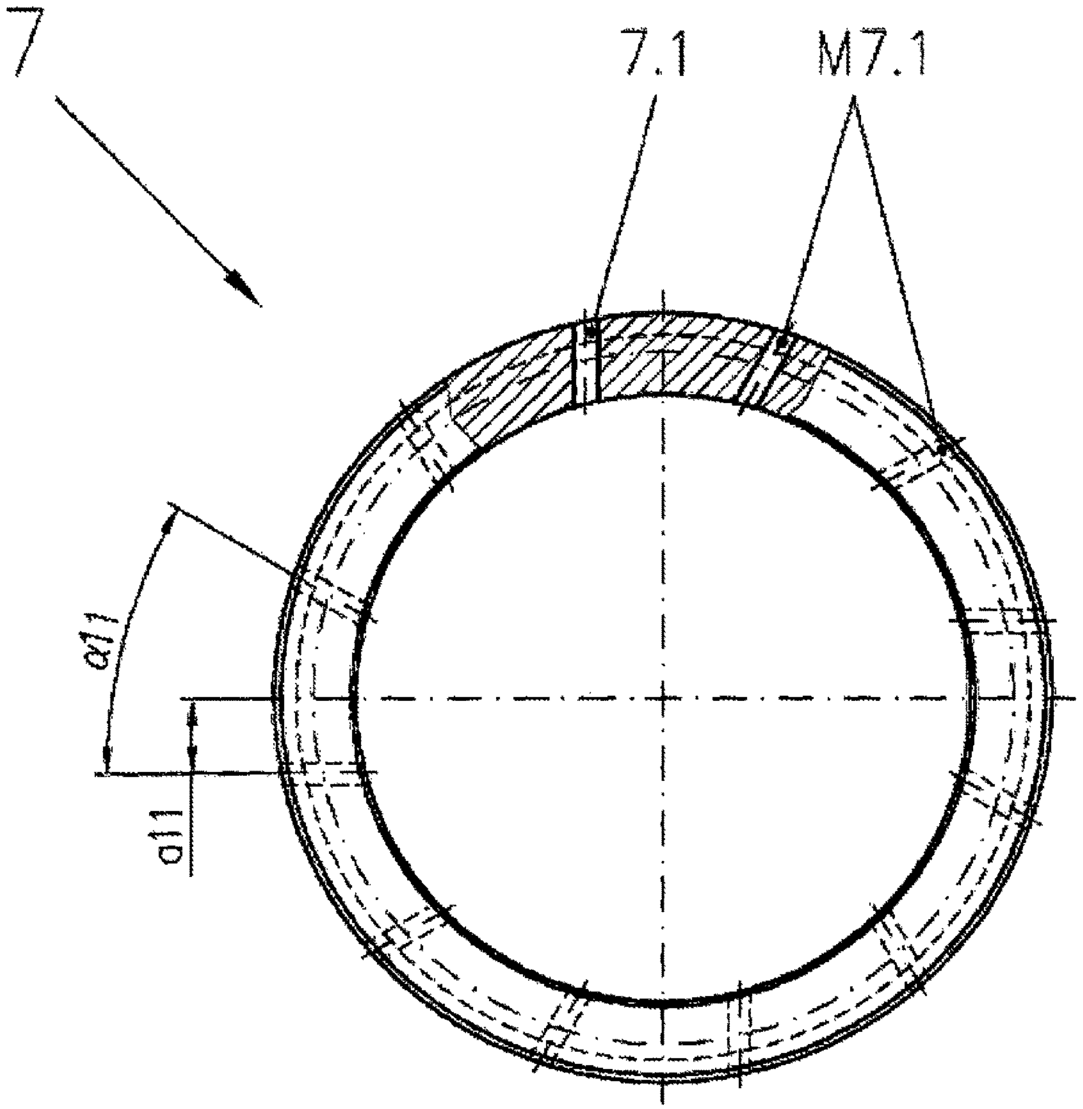
FIGS. 16*a* and 16*b* show a plan view in partial section and a side view in partial section, respectively, of an insulating part which is or can be used, for example, in the plasma torch in FIGS. 6 to 9.
Figure 16B:
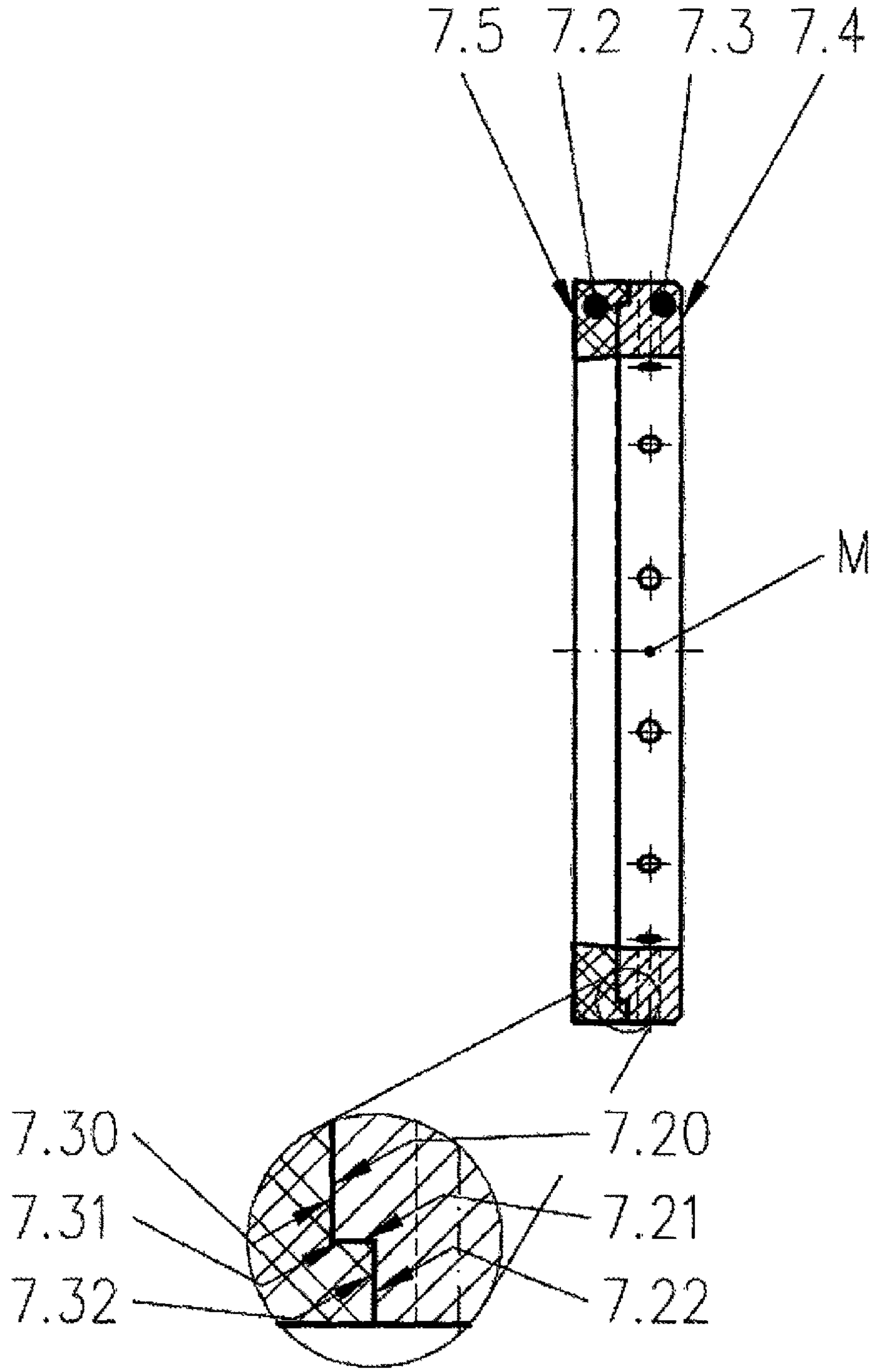

FIGS. 16*a* and 16*b* likewise show a secondary-gas conveying part 7 for a secondary gas SG, which consists of two parts. A first part 7.2 consists of an electrically nonconductive material with good thermal conductivity, while a second part 7.3 consists of a material with good electrical conductivity and good thermal conductivity.

For the part 7.2 of the secondary-gas conveying part 7, use is made here for example of ceramic, again for example aluminum nitride, which has very good thermal conductivity (about 180 W/(m*K)) and high electrical resistivity (about $10^{12}$ Ω·cm). For the part 7.3 of the secondary-gas conveying part 7, use is made here of a metal, for example silver, copper, aluminum, tin, zinc, iron, alloyed steel or a metal alloy (for example brass) in which these metals are contained individually or in a total amount of at least 50%.

If for example copper is used for the part 7.3, the thermal conductivity of the secondary-gas conveying part 7 is greater than if it only consisted of electrically nonconductive material with good thermal conductivity, for example aluminum nitride. Depending on its purity, copper has greater thermal conductivity (max. about 390 W/(m*K)) than aluminum nitride (about 180 W/(m*K)), which is currently considered to be one of the best thermally conducting materials which does not simultaneously have good electrical conductivity. On account of the better conductivity, this results in even better heat exchange between the nozzle protective cap 8 and the nozzle cap 5 of the plasma cutting torch 1 according to FIGS. 6 to 9.

In the simplest case, the parts 7.2 and 7.3 are connected together by the contact faces 7.21 and 7.31 being pushed one over the other.

The parts 7.2 and 7.3 can also be connected in a force-fitting manner by way of the pressed-together, opposing and touching contact faces 7.20 and 7.30, 7.21 and 7.31, and 7.22 and 7.32. The contact faces 7.20, 7.21 and 7.22 are contact faces of the part 7.2 and the contact faces 7.30, 7.31 and 7.32 are contact faces of the part 7.3. The cylindrically configured contact faces 7.31 (cylindrical outer face of the part 7.3) and 7.21 (cylindrical inner face of the part 7.2) form a force-fitting connection by being pressed into one another. In this case, an interference fit DIN EN ISO 286 (for example H7/n6; H/m6) is used between the cylindrical inner and outer faces.

It is also possible to connect the two parts together by way of a form fit, by soldering and/or by adhesive bonding.

Since the mechanical machining of the ceramic material is usually more difficult than that of a metal, the machining complexity drops. Here, for example twelve bores 7.1 have been introduced into the metal part 7.3, said bores having a radial offset a11 and being distributed equidistantly at an angle α11 around the circumference of the gas duct. Very different formations, for example grooves, cutouts, bores etc., are also easier to produce when they are introduced into the metal.

Figure 17A:
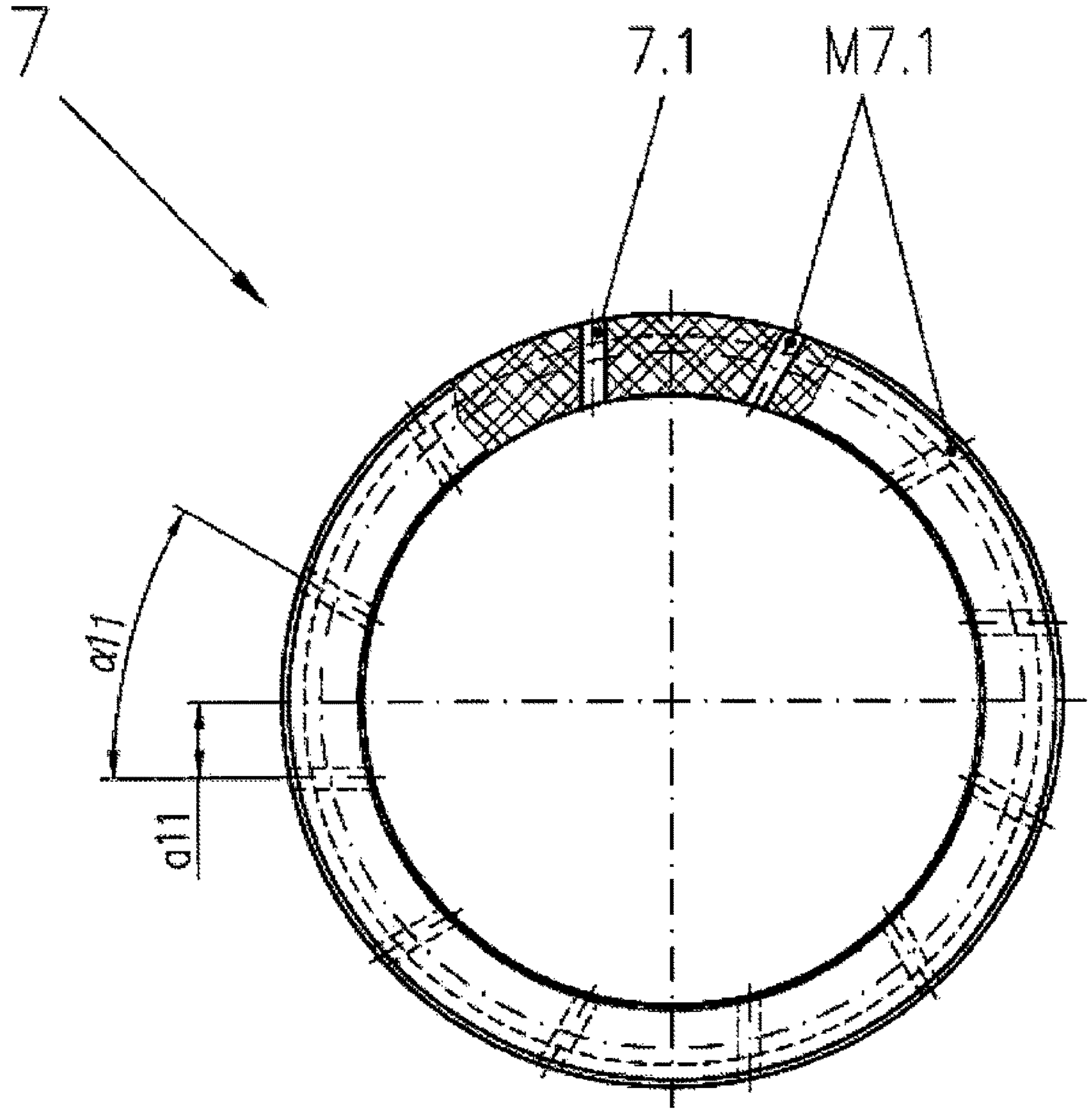
FIGS. 17*a* and 17*b* show a plan view in partial section and a side view in partial section, respectively, of an insulating part which is or can be used, for example, in the plasma torch in FIGS. 6 to 9.
Figure 17B:
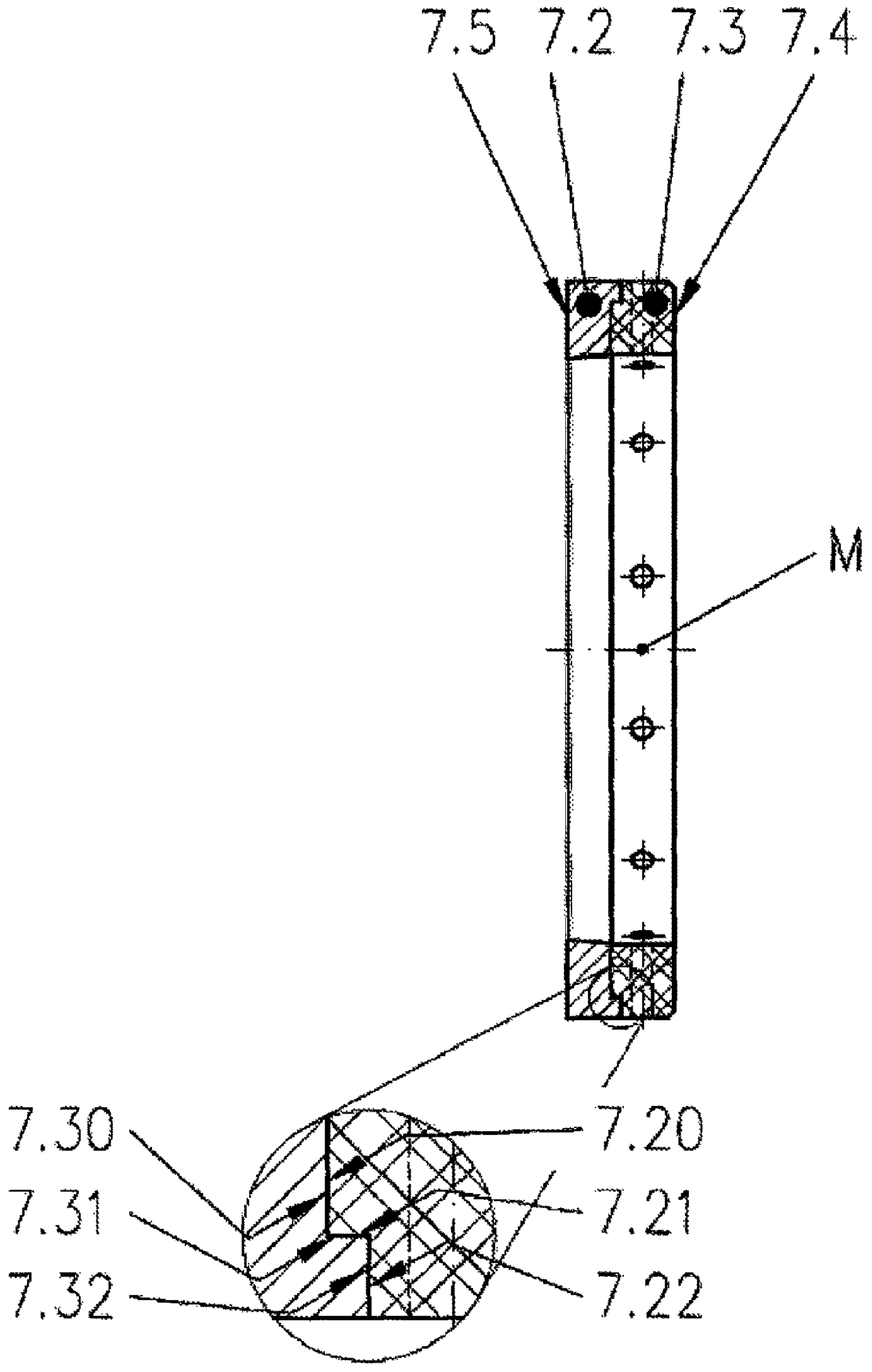

FIGS. 17*a* and 17*b* likewise show a secondary-gas conveying part 7 for a secondary gas SG, which consists of two parts. In contrast to the embodiment according to FIG. 16, a first part 7.2 consists here of a material with good electrical conductivity and good thermal conductivity and a second part 7.3 consists of an electrically nonconductive material with good thermal conductivity. Otherwise, the same observations as made with regard to FIGS. 16*a* and 6*b* apply.

FIGS. 18*a*, 18*b*, 18*c* and 18*d* show a further embodiment of a secondary-gas conveying part 7 for a secondary gas SG, which can be used in a plasma cutting torch according to FIGS. 6 to 9.

Figures 18A, 18B:
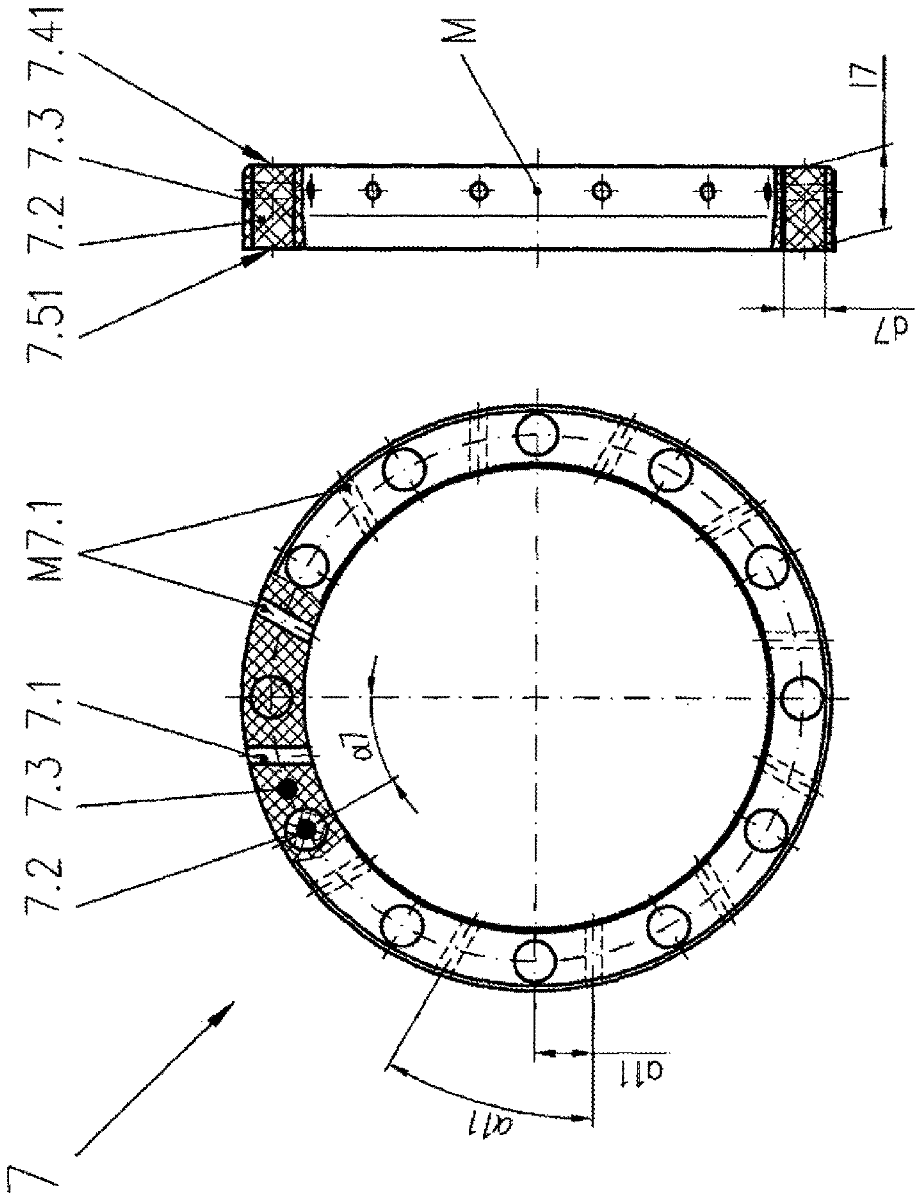
FIGS. 18*a* to 18*d* show a plan view in partial section and sectional side views of an insulating part according to a further particular embodiment of the present invention.
Figure 18C:
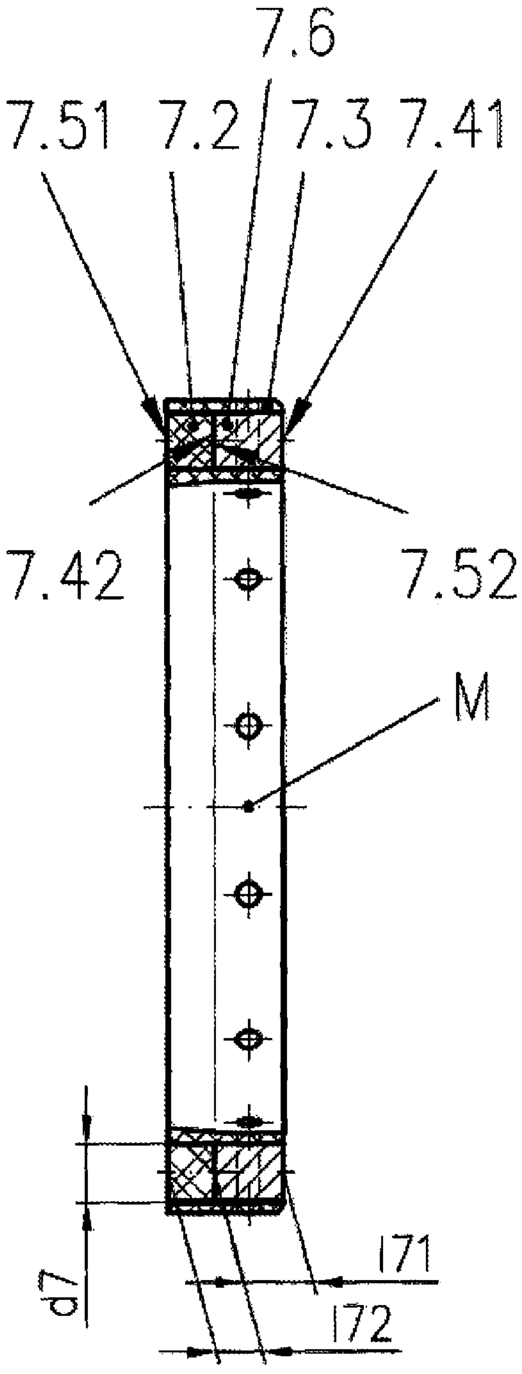
Figure 18D:
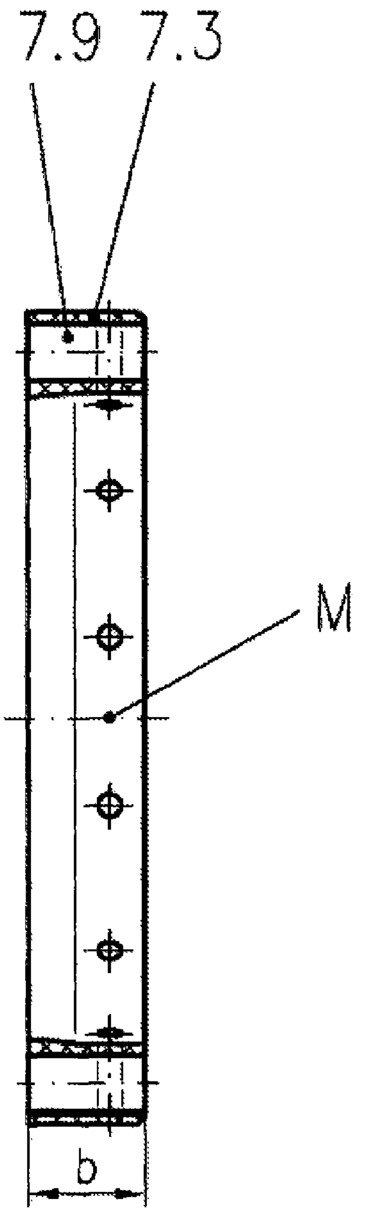

FIG. 18*a* shows a plan view and FIGS. 18*b* and 18*c* show sectional side views of different embodiments thereof. FIG. 18*d* shows a part 7.3, consisting of electrically nonconductive and thermally nonconductive material, of the secondary-gas conveying part 7.

Located in the part 7.3 of the secondary-gas conveying part 7 are radially arranged bores 7.1 which can also be radial or radially offset and/or radially inclined with respect to the center line M and through which the secondary gas SG can flow when the secondary-gas conveying part 7 has been fitted in the plasma cutting torch 1. In this example, twelve bores are radially offset by a dimension a11 and are distributed equidistantly around the circumference, wherein the angle which is enclosed by the midpoints of the bores is denoted α11 (for example 30° here). However, there may also be openings, grooves or cutouts through which the secondary gas SG flows when the secondary-gas conveying part 7 has been fitted in the plasma cutting torch 1 (see in this regard for example FIGS. 6 to 9).

FIG. 18*d* shows that in this example the part 7.3 has twelve further axially arranged bores 7.9 which are larger than the bores or openings 7.1.

In FIGS. 18*a* and 18*b*, twelve parts 7.2, which are illustrated here for example as round pins, have been introduced into these bores 7.9. The round pins 7.2 consist of an electrically nonconductive material with good thermal conductivity, while the part 7.3 consists of an electrically nonconductive and thermally nonconductive material.

When the secondary-gas conveying part 7 has been fitted in the plasma cutting torch 1 according to FIGS. 6 to 9, contact faces 7.51 of the round pins 7.2 are in touching contact with a contact face 5.3 (annular face here, for example) of the nozzle cap 5 and contact faces 7.41 of the round pins 7.2 are in touching contact with a contact face 8.2 (annular face here, for example) of the nozzle protective cap (FIGS. 6 to 9).

The parts 7.2 have a diameter d7 and a length l7 which is at least as great as the width b of the part 7.3. It is even better when the length l7 is slightly greater in order to obtain secure contact between the contact faces of the round pins 7.2 and the nozzle cap 5 and the nozzle protective cap 8.

FIG. 18*c* shows another embodiment of the secondary-gas conveying part 7 for secondary gas. In this case, two parts 7.2 and 7.6 indicated as round pins for example have been introduced into each bore 7.9. The part 7.3 consists of an electrically nonconductive and thermally nonconductive material, the round pins 7.2 consist of an electrically nonconductive material with good thermal conductivity and the round pins 7.6 consist of a material with good electrical conductivity and good thermal conductivity.

When the secondary-gas conveying part 7 has been fitted in the plasma cutting torch 1 according to FIGS. 6 to 9, contact faces 7.51 of the round pins 7.2 are in touching contact with a contact face 5.3 (annular face here, for example) of the nozzle cap 5 and contact faces 7.41 of the round pins 7.6 are in touching contact with a contact face 8.2 (annular face here, for example) of the nozzle protective cap 8 (see also FIGS. 6 to 9). Both round pins 7.2 and 7.6 are connected by their contact faces 7.42 and 7.52 touching.

The parts 7.2 have a diameter d7 and a length l71. In this example, the parts 7.6 have the same diameter and a length l72, wherein the sum of the lengths l71 and l72 is at least as great as the width b of the part 7.3. It is even better when the sum of the lengths is slightly greater, for example greater than 0.1 mm, in order to obtain secure contact between the contact faces 7.51 of the round pins 7.2 and the nozzle cap 5 and the contact faces 7.41 of the round pins 7.6 and the nozzle protective cap 8.

As FIG. 18*c* and the associated description show, the present invention thus also relates in a generalized form to an insulating part for a plasma torch, in particular a plasma cutting torch, for electrical insulation between at least two electrically conductive components of the plasma torch, wherein the insulating part consists of at least three parts, wherein one of the parts consists of an electrically nonconductive material with good thermal conductivity, one other of the parts consists of an electrically nonconductive and thermally nonconductive material, and the further part or a further one of the parts consists of a material with good electrical conductivity and good thermal conductivity.

The secondary-gas conveying parts 7 shown in FIGS. 15 to 18 can also be used in a plasma cutting torch 1 according to FIG. 5. There, by using this secondary-gas conveying part 7, electrical insulation is achieved between the nozzle protective cap 8 and the nozzle 4. In combination with the secondary gas SG, the electrical insulation protects the nozzle 4 and the nozzle protective cap 8 from arcs which can form between them and a workpiece. These are referred to as double arcs and can result in damage to the nozzle 4 and the nozzle protective cap 8.

At the same time, heat is transferred between the nozzle protective cap 8 and the nozzle 4 from the hotter to the colder component, in this case from the nozzle protective cap 8 to the nozzle 4, via the insulating part with good thermal conductivity that is configured as a secondary-gas conveying part 7. The secondary-gas conveying part 7 is in touching contact with the nozzle protective cap 8 and the nozzle 4. For the exemplary embodiments of the secondary-gas conveying part 7 that are shown in FIGS. 15, 16 and 17, this takes place via the annular contact faces 8.2 of the nozzle protective cap 8 and the annular contact faces 7.4 of the secondary-gas conveying part 7 and the annular contact faces 7.5 of the secondary-gas conveying part 7 and the annular contact faces 4.4 of the nozzle 4, which, as illustrated in FIG. 5, touch.

In the exemplary embodiments of the secondary-gas conveying part 7 shown in FIGS. 18*b* and 18*c*, the heat transfer takes place via the annular contact face 8.2 of the nozzle protective cap 8 and the contact faces 7.41 of the round pins 7.2 or 7.6 of the secondary-gas conveying part 7 and 7.51 of the round pins 7.2 by touching the contact face 4.4 (the annular face for example, here) of the nozzle 4, as illustrated in FIG. 5.

FIGS. 19*a* to 19*d* show sectional illustrations of arrangements of a nozzle 4 and a secondary-gas conveying part 7 for a secondary gas SG according to particular embodiments of the invention in FIGS. 15 to 18. The statements given with respect to FIG. 5 and FIGS. 15 to 18 apply here.

Figure 19B:
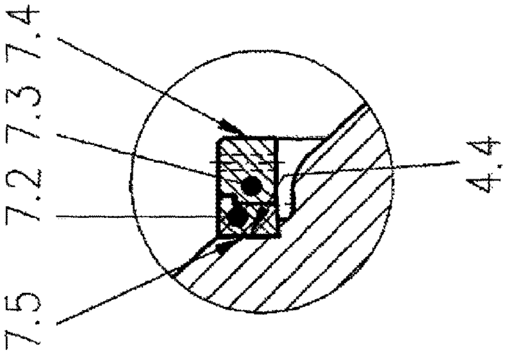
FIGS. 19*a* to 19*d* show sectional views of an arrangement made up of a nozzle and of an insulating part according to one particular embodiment of the invention.
Figure 19A:
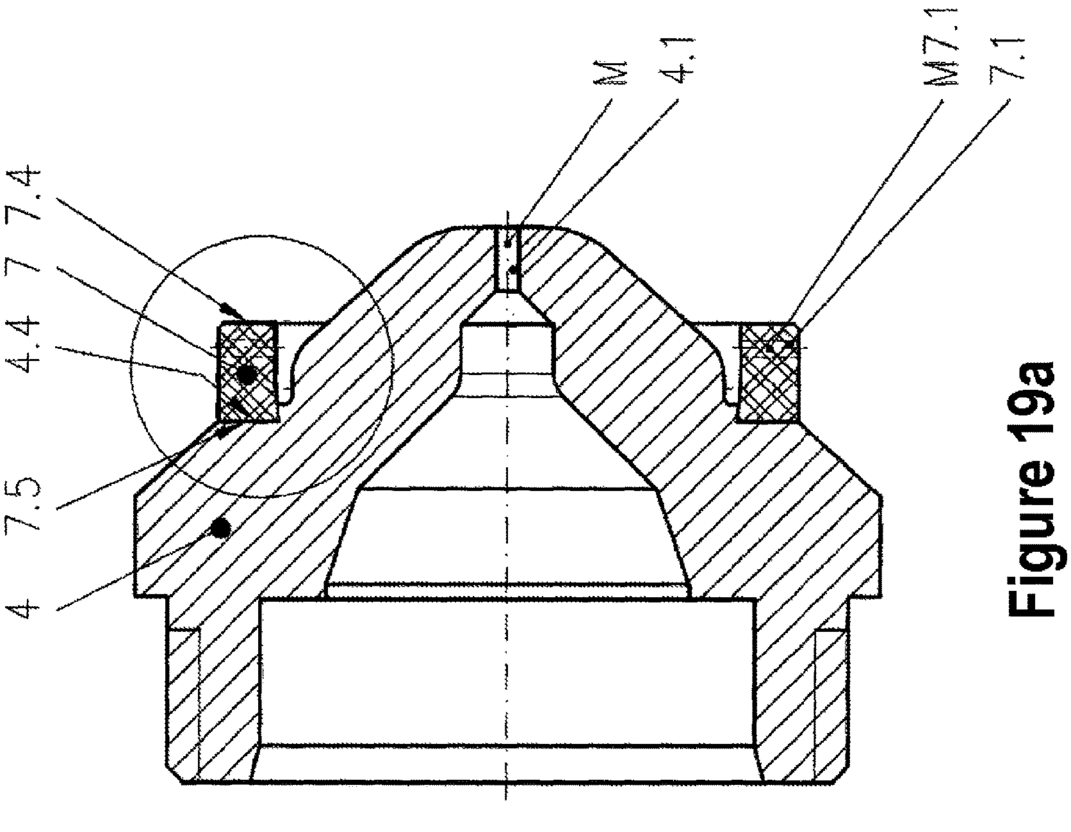
Figure 19C:
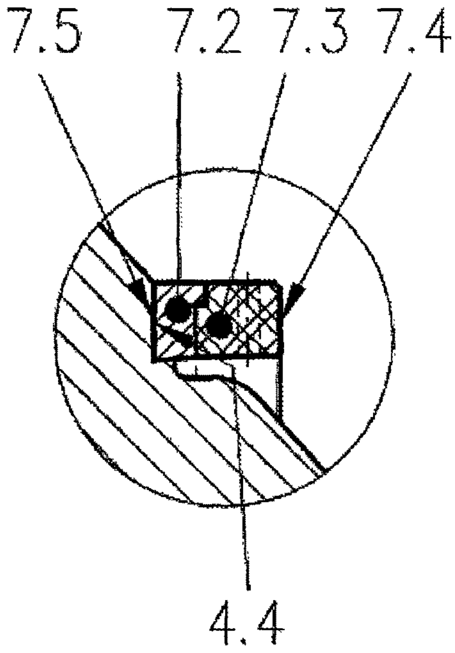
Figure 19D:
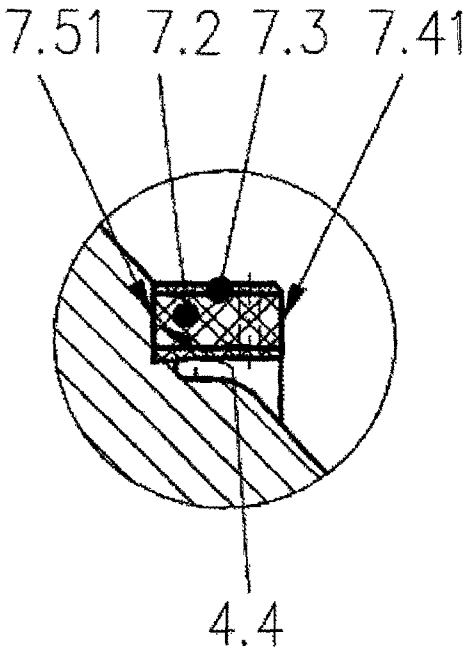

In this case, FIG. 19*a* shows an arrangement with a secondary-gas conveying part 7 according to FIGS. 15*a* and 15*b*, FIG. 19*b* shows an arrangement with a secondary-gas conveying part according to FIGS. 16*a* and 16*b*, FIG. 19*c* shows an arrangement with a secondary-gas conveying part according to FIGS. 17*a* and 17*b* and FIG. 19*d* shows an arrangement with a secondary-gas conveying part according to FIG. 18*a* and FIG. 18*b*.

In these exemplary embodiments, the secondary-gas conveying part 7 can be connected to the nozzle 4 in the simplest case by one being pushed over the other. They can also be connected in a form-fitting and force-fitting manner or by adhesive bonding, however. When metal/metal and/or metal/ceramic is used at the connecting point, soldering is also possible as a connection.

FIGS. 20*a* to 20*d* show sectional illustrations of arrangements of a nozzle cap 5 and a secondary-gas conveying part 7 for a secondary gas SG according to FIGS. 15 to 18 according to particular embodiments of the invention. The statements given with respect to FIGS. 6 to 9 and FIGS. 15 to 18 apply here.

Figure 20B:
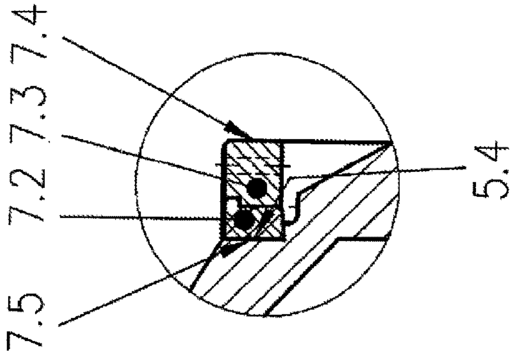
FIGS. 20*a* to 20*d* show sectional views of an arrangement made up of a nozzle cap and of an insulating part according to one particular embodiment of the present invention.
Figure 20A:
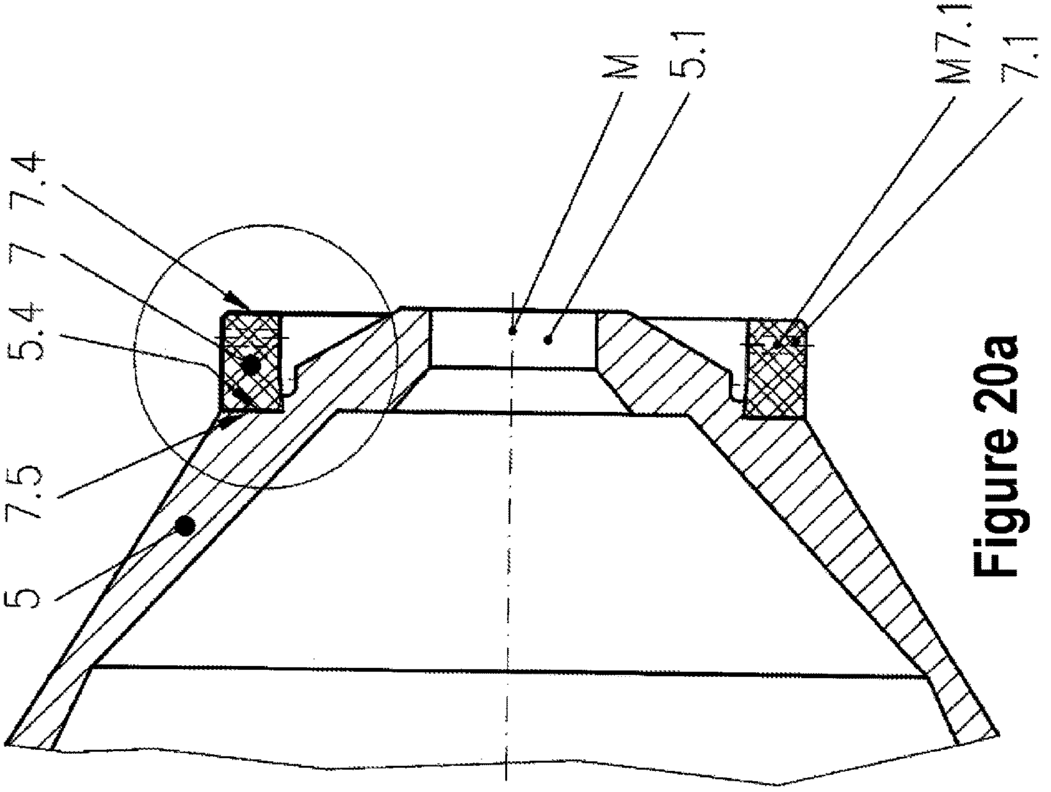
Figure 20C:
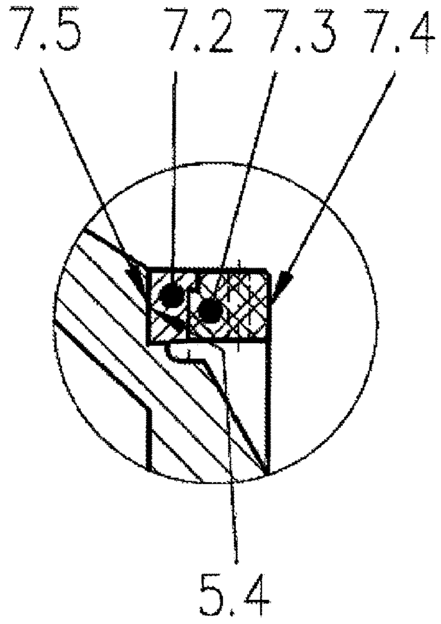
Figure 20D:
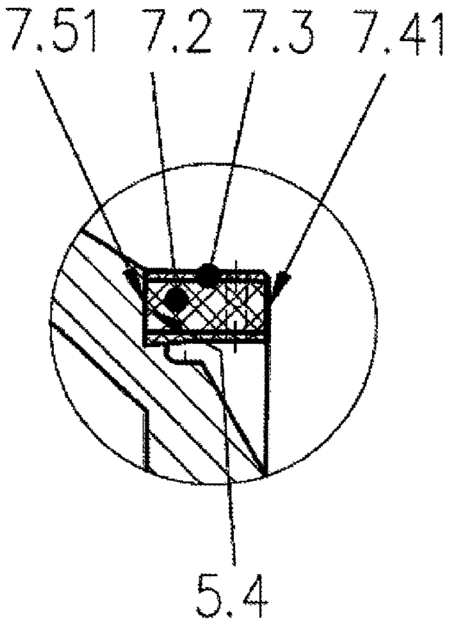

In this case, FIG. 20*a* shows an arrangement with a secondary-gas conveying part according to FIGS. 15*a* and 15*b*; FIG. 20*b* shows an arrangement with a secondary-gas conveying part according to FIGS. 16*a* and 16*b*; FIG. 20*c* shows an arrangement with a secondary-gas conveying part according to FIGS. 17*a* and 17*b* and FIG. 20*d* shows an arrangement with a secondary-gas conveying part according to FIGS. 18*a* to 18*d*.

In these exemplary embodiments, the secondary-gas conveying part 7 can be connected to the nozzle cap 5 in the simplest case by one being pushed over the other. They can also be connected in a form-fitting and force-fitting manner or by adhesive bonding, however. When metal/metal and/or metal/ceramic is used at the connecting point, soldering is also possible as a connection.

FIGS. 21*a* to 21*d* show sectional illustrations of arrangements of a nozzle protective cap 8 and a secondary-gas conveying part 7 for a secondary gas SG according to FIGS. 15 to 18. The statements given with respect to FIGS. 5 to 9 and FIGS. 15 to 18 apply here.

Figure 21B:
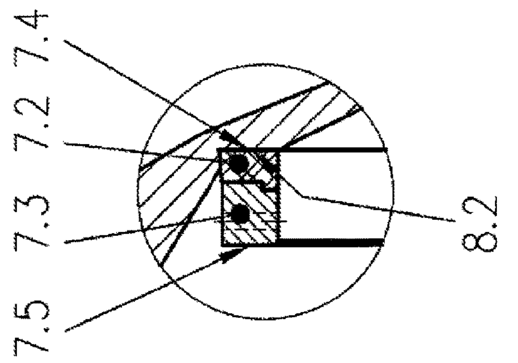
FIGS. 21*a* to 21*d* show sectional views of an arrangement made up of a nozzle protective cap and of an insulating part according to one particular embodiment of the present invention.
Figure 21A:
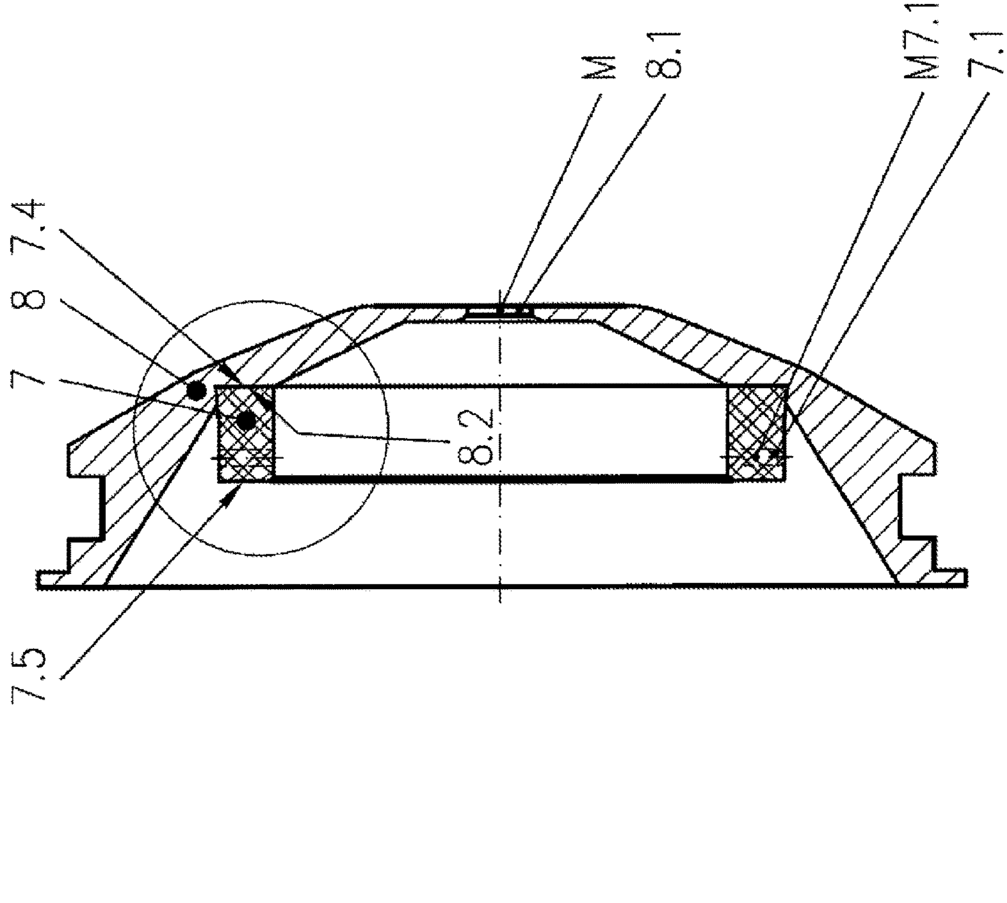
Figure 21C:
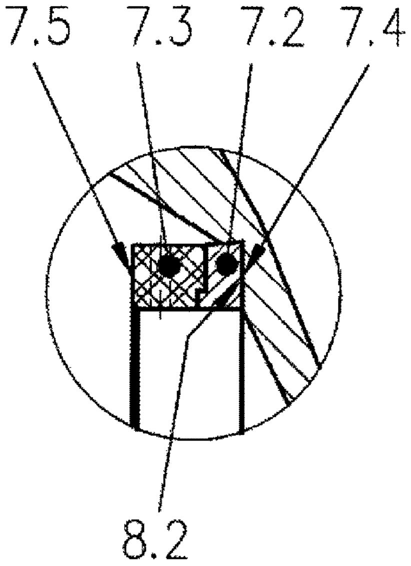
Figure 21D:
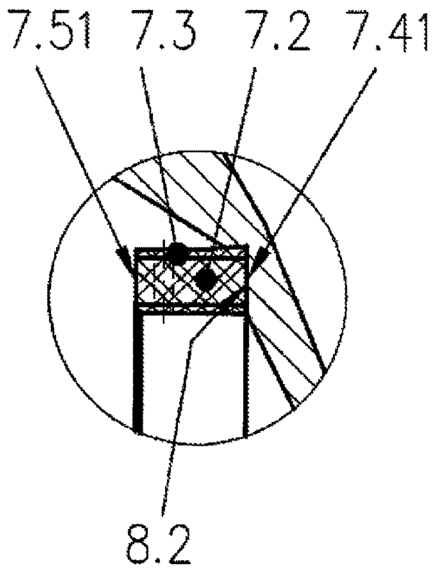

In this case, figure FIG. 21*a* shows an arrangement with a secondary-gas conveying part according to FIGS. 15*a* and 15*b*; FIG. 21*b* shows an arrangement with a secondary-gas conveying part according to FIGS. 16*a* and 16*b*; FIG. 21*c* shows an arrangement with a secondary-gas conveying part according to FIGS. 17*a* and 17*b* and FIG. 21*d* shows an arrangement with a secondary-gas conveying part according to figures FIGS. 18*a* to 18*d*.

In these exemplary embodiments, the secondary-gas conveying part 7 can be connected to the nozzle protective cap 8 in the simplest case by one being pushed over the other. They can also be connected in a form-fitting and force-fitting manner or by adhesive bonding, however. When metal/metal and/or metal/ceramic is used at the connecting point, soldering is also possible as a connection.

Figure 22B:
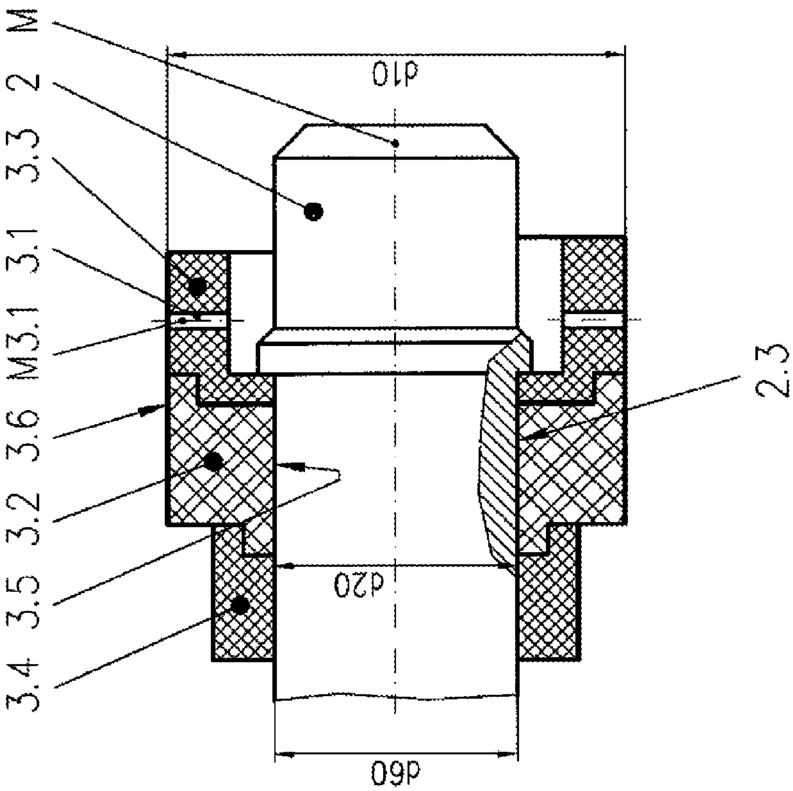
FIGS. 22*a* and 22*b* show views in partial section of an arrangement made up of an electrode and of an insulating part according to one particular embodiment of the present invention.
Figure 22A:
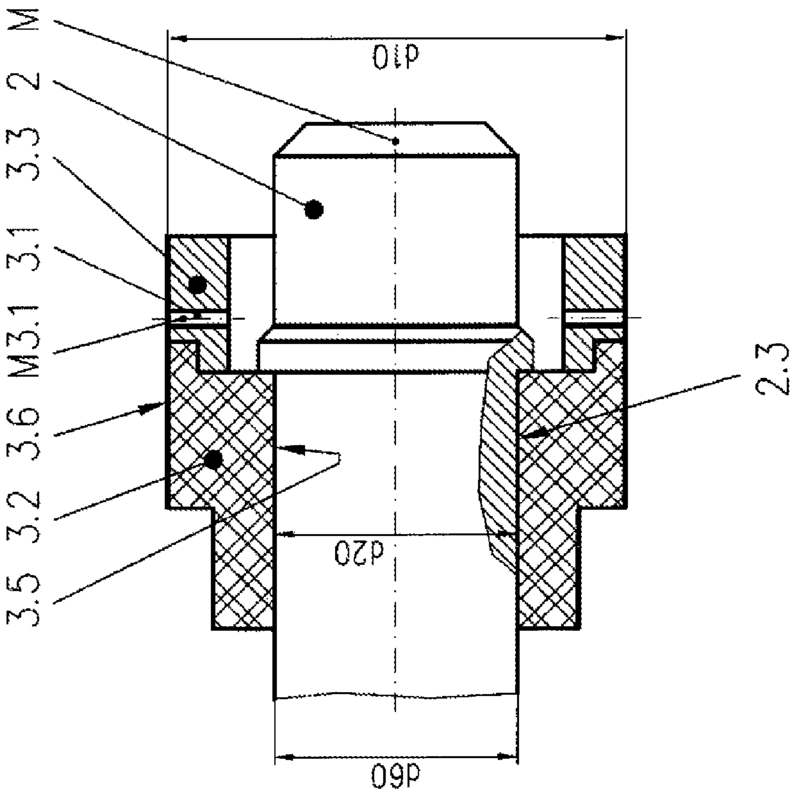

FIGS. 22*a* and 22*b* show arrangements of an electrode 2 and a plasma-gas conveying part 3 for a plasma gas PG according to FIGS. 11 to 13 according to particular embodiments of the invention.

In this case, FIG. 22*a* shows an arrangement with a plasma-gas conveying part according to FIG. 11*a* and FIG. 11*b*, and FIG. 22*b* shows an arrangement with a plasma-gas conveying part according to FIG. 13*a* and FIG. 13*b*.

In this exemplary embodiment, a contact face 2.3 is for example a cylindrical outer face of the electrode 2 and a contact face 3.5 is a cylindrical inner face of the plasma-gas conveying part 3. Preferably, a clearance fit with a small clearance, for example H7/h6 according to DIN EN ISO 286, between the cylindrical inner and outer faces is used here in order to realize both the plugging into one another and also good contact and thus low thermal resistance and thus good heat transfer. The heat transfer can be improved by applying thermally conductive paste to these contact faces. A fit with a larger clearance, for example H7/g6, can then be used.

It is also possible to use an interference fit between the plasma-gas conveying part 3 and the electrode 2. This improves heat transfer, of course. However, it has the consequence that the electrode 2 and plasma-gas conveying part 3 can only be replaced together in the plasma cutting torch 1.

Figure 23:
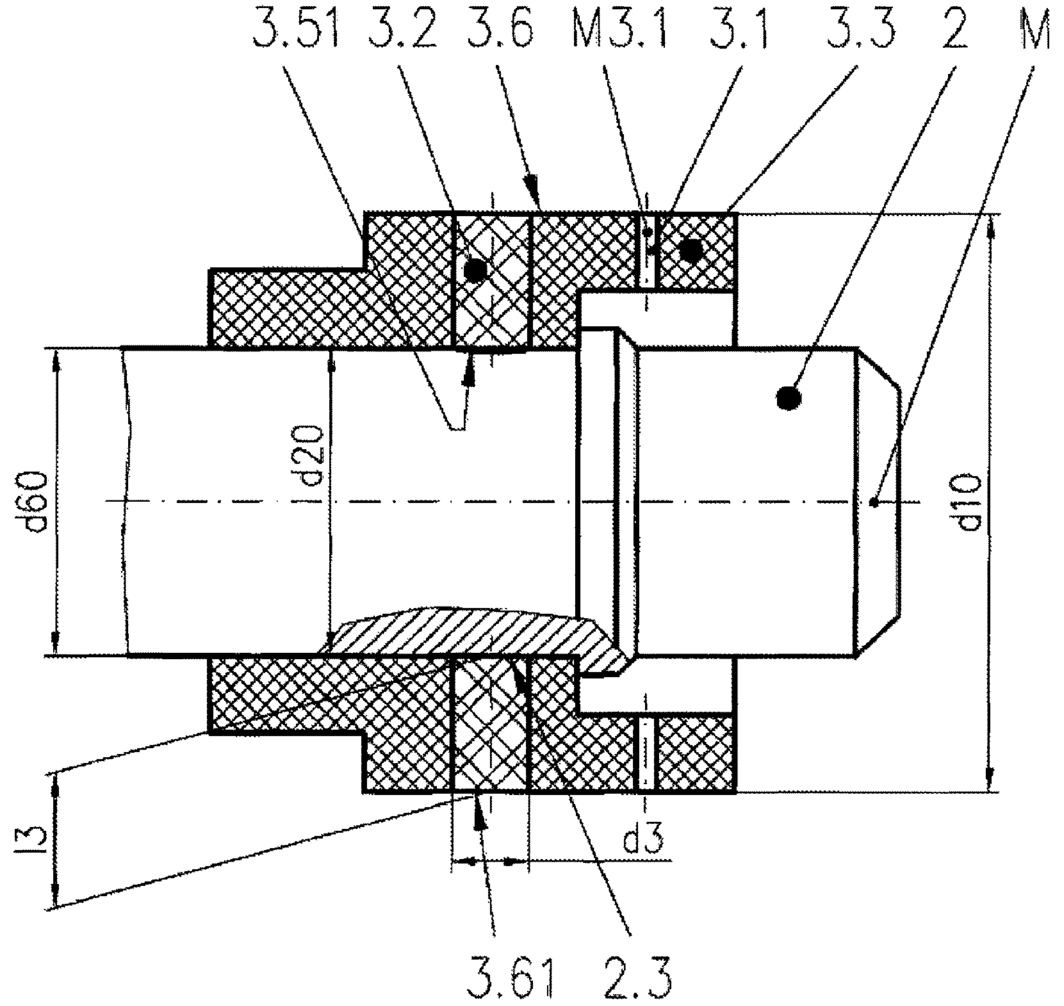
FIG. 23 shows a side view in partial longitudinal section of an arrangement made up of an electrode and of an insulating part according to one particular embodiment of the present invention.

FIG. 23 shows an arrangement of an electrode 2 and a plasma-gas conveying part 3 for a plasma gas PG according to one particular embodiment of the present invention.

In this arrangement, contact faces 3.51 of the round pins 3.2 of the plasma-gas conveying part 3 are in touching contact with a contact face 2.3 (cylindrical outer face for example, here) of the electrode 2 (see also FIGS. 1 to 9).

The parts 3.2 have a diameter d3 and a length l3 which is at least as great as half the difference of the diameters d10 and d20 of the part 3.3. It is even better when the length l3 is slightly greater in order to obtain secure contact between the contact faces of the round pins 3.2 and the nozzle 4 and the electrode 2. It is also advantageous for the surface of the contact faces 3.61 and 3.51 not to be planar, but to be adapted to the cylindrical outer face (contact face 2.3) of the electrode 2 and to the cylindrical inner face (contact face 4.3) of the nozzle such that a form fit is produced.

The arrangements made up of wearing parts and the insulating part or the gas-conveying part are listed only by way of example. Other combinations, for example nozzle and gas-conveying part, are also possible, of course.

Where reference was made to cooling liquid or the like in the above description, a cooling medium is quite generally intended to be meant thereby.

Arrangements and complete plasma torches, inter alia, are described in the above description. It goes without saying for a person skilled in the art that the invention can also consist of subcombinations and individual parts, for example components or wearing parts. Therefore, protection is also explicitly claimed therefor.

Finally, a few definitions which are intended to apply to the entire description above:

"Good electrical conductivity" is intended to mean that the electrical resistivity is at most 0.01 Ω*cm.

"Electrically nonconductive" is intended to mean that the resistivity is at least $10^6$ Ω*cm, better still at least $10^{10}$ Ω*cm and/or that the dielectric strength is at least 7 kV/mm, better still at least 10 kV/mm.

"Good thermal conductivity" is intended to mean that the thermal conductivity is at least 40 W/(m*K), better still at least 60 W/(m*K), even better still at least 90 W/(m*K).

"Good thermal conductivity" is intended to mean that the thermal conductivity is at least 120 W/(m*K), better still at least 150 W/(m*K), even better still at least 180 W/(m*K).

Finally, "good thermal conductivity" particularly for metals is understood to mean that the thermal conductivity is at least 200 W/(m*K), better still at least 300 W/(m*K).

The features of the invention that are disclosed in the above description, in the drawing and in the claims can be essential both individually and in any desired combinations in order to realize the invention in its various embodiments.

LIST OF REFERENCE SIGNS

1 Plasma cutting torch
2 Electrode
2.1 Electrode holder
2.2 Emission insert
2.3 Contact face
2.10 Coolant space
3 Plasma-gas conveying part
3.1 Bore
3.2 Part
3.3 Part
3.4 Part
3.5 Contact face
3.6 Contact face
3.7 Contact face
3.8 Groove
3.9 Bore
3.20 Contact face
3.21 Contact face
3.22 Contact face
3.23 Contact face
3.24 Contact face
3.25 Contact face
3.30 Contact face
3.31 Contact face
3.32 Contact face
3.43 Contact face
3.44 Contact face
3.45 Contact face
3.51 Contact face
3.61 Contact face
4 Nozzle
4.1 Nozzle bore
4.2 Interior space
4.3 Contact face
4.4 Contact face
4.5 Contact face
4.10 Coolant space
4.20 External thread
5 Nozzle cap
5.1 Nozzle cap bore
5.3 Contact face
5.20 Internal thread
6 Nozzle holder
6.10 Coolant space
6.11 Coolant space
6.20 Internal thread
6.21 External thread
7 Secondary-gas conveying part
7.1 Bore
7.2 Part
7.3 Part
7.4 Contact face
7.5 Contact face
7.6 Part
7.9 Bores
7.20 Contact face
7.21 Contact face
7.22 Contact face
7.30 Contact face
7.31 Contact face
7.32 Contact face
7.41 Contact face
7.42 Contact face
7.51 Contact face
7.52 Contact face
8 Nozzle protective cap
8.1 Nozzle protective cap bore
8.2 Contact face
8.3 Contact face
8.10 Interior space
8.11 Interior space
9 Nozzle protective cap holder
9.1 Contact face
9.10 Interior space
9.20 Internal thread
10 Cooling pipe
10.1 Coolant space
11 Receptacle
11.1 Part
11.2 Part
11.5 Contact face
11.6 Contact face
11.10 Coolant passage
11.11 Coolant passage
11.20 External thread
PG Plasma gas
SG Secondary gas
WR1 Coolant return line 1
WR2 Coolant return line 2
WV1 Coolant feed line 1
WV2 Coolant feed line 2
a1 Radial offset
a11 Radial offset
b Width
d3 Diameter
d7 Diameter
d10 Outside diameter
d11 Inside diameter
d15 Diameter
d20 Inside diameter
d21 Outside diameter
d25 Diameter
d30 Inside diameter
d31 Outside diameter
d60 Outside diameter
l3 Length l31 Length
l32 Length
l7 Length
l71 Length
l72 Length
l73 Length
l2 Length
M Center line
M3.1 Center line
M3.2 Center line
M3.9 Center line
M7.1 Center line
M3.6 Center line
α1 Angle
α3 Angle
α7 Angle
α11 Angle

The invention claimed is:

1. A plasma torch including:

an electrode a nozzle; and a plasma gas conveying part arranged between the electrode and the nozzle, the plasma gas conveying part comprising:

a first part and a second part; and an inner face adjacent a cavity located in the plasma gas conveying part;

wherein at least a portion of the first part and at least a portion of the second part are arranged concentrically to one another;

wherein the plasma gas conveying part additionally includes a third part;

wherein the first part is arranged between the second part and the third part;

wherein the third part has the same thermal and electrical properties as the second part;

wherein at least a portion of the first part and at least a portion of the third part are arranged concentrically to one another; and wherein at least a portion of the second part and at least a portion of the third part are arranged concentrically to one another.

2. The plasma torch as claimed in claim 1, characterized in that the first part has at least one surface being aligned with or projecting beyond an immediately adjacent surface of the second part.

3. The plasma torch of claim 1, wherein:

the first part comprises an electrically nonconductive material having a thermal conductivity of at least 40 W/(m*K); and the second part comprises an electrically conductive material having a thermal conductivity of at least 40 W/(m*K).

4. The plasma torch as claimed in claim 3, characterized in that the first part has a thermal conductivity of at least 60 W/(m*K).

5. The plasma torch as claimed in claim 3, characterized in that the first part has an electrical resistivity of at least $10^6$ Ω*cm.

6. The plasma torch as claimed in claim 3, characterized in that the first part is a ceramic or plastics material.

7. The plasma torch of claim 3, wherein the electrical conductivity of the first part has an electrical resistivity of 0.1 Ω*cm or less.

8. The plasma torch of claim 1, wherein:

the first part comprises an electrically nonconductive material having a thermal conductivity of at least 40 W/(m*K); and the second part comprises an electrically nonconductive and thermally nonconductive material.

9. The plasma torch as claimed in claim 8, characterized in that the second part has a thermal conductivity of at most 1 W/(m*K).

10. The plasma torch as claimed in claim 1, characterized in that the first part and the second part are connected together in one or a combination of two or more of a form-fitting, a force-fitting or cohesive manner, by adhesive bonding or by a thermal method.

11. The plasma torch as claimed in claim 1, characterized in that the plasma gas conveying part has at least one opening and/or at least one cutout and/or at least one groove.

12. The plasma torch as claimed in claim 1, further comprising a nozzle cap, a nozzle protective cap, and a nozzle protective cap holder.

13. The plasma torch as claimed in claim 12, characterized in that the plasma gas conveying part is in direct contact with at least one of the electrode, the nozzle, the nozzle cap, the nozzle protective cap, or the nozzle protective cap holder.

14. The plasma torch as claimed in claim 1, characterized in that the first part has at least one surface in direct contact with a surface of a component of the plasma torch having an electrical resistivity of at most 0.01 Ω*cm.

15. The plasma torch as claimed in claim 1, characterized in that the plasma gas conveying part has at least one surface which is in direct contact with a cooling medium during operation.

16. A method for machining a workpiece with a thermal plasma or for plasma cutting or for plasma welding, characterized in that the plasma torch as claimed in claim 1 is used in the machining.

17. The method as claimed in claim 16, characterized in that a laser beam of a laser is coupled into the plasma torch in addition to a plasma jet.

18. The plasma torch of claim 1, wherein:

the plasma gas conveying part additional includes an outer contact face in touching contact with an inner contact face of the nozzle; and the inner contact face of the plasma gas conveying part is in touching contact with an outer contact face of the electrode.

19. The plasma torch of claim 18, wherein:

the outer face of the plasma gas conveying part comprises a cylindrical surface; and the inner face of the plasma gas conveying part comprises a cylindrical surface.

20. A plasma torch including:

a nozzle;

a nozzle protective cap;

a primary plasma gas conveying part;

a secondary plasma gas conveying part separate from the primary plasma gas conveying part and arranged between the nozzle and the nozzle protective cap, the secondary plasma gas conveying part comprising:

a first part and a second part; and an inner face adjacent a cavity located in the secondary plasma gas conveying part;

wherein at least a portion of the first part and at least a portion of the second part are arranged concentrically to one another;

wherein the plasma gas conveying part additionally includes a third part;

wherein the first part is arranged between the second part and the third part;

wherein the third part has the same thermal and electrical properties as the second part;

wherein at least a portion of the first part and at least a portion of the third part are arranged concentrically to one another; and wherein at least a portion of the second part and at least a portion of the third part are arranged concentrically to one another.

21. The plasma torch of claim 20, further comprising:

a nozzle cap positioned between the nozzle and the nozzle protective cap, wherein the secondary plasma gas conveying part is arranged between the nozzle cap and the nozzle protective cap.

22. The plasma torch of claim 20, wherein:

the first part comprises an electrically nonconductive material having a thermal conductivity of at least 40 W/(m*K); and the second part comprises an electrically conductive material having a thermal conductivity of at least 40 W/(m*K).

23. The plasma torch of claim 20, wherein:

the first part comprises an electrically nonconductive material having a thermal conductivity of at least 40 W/(m*K); and the second part comprises an electrically nonconductive and thermally nonconductive material.

* * * * *